US009654556B2

(12) United States Patent
Chan et al.

(10) Patent No.: US 9,654,556 B2
(45) Date of Patent: *May 16, 2017

(54) MANAGING APPLICATIONS ON AN ELECTRONIC DEVICE

(71) Applicant: NEXTBIT SYSTEMS INC., San Francisco, CA (US)

(72) Inventors: Michael A Chan, San Francisco, CA (US); Justin Quan, San Francisco, CA (US); Brian Chu, San Mateo, CA (US); Aanchal Jain, Brisbane, CA (US)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 14/840,636

(22) Filed: Aug. 31, 2015

(65) Prior Publication Data

US 2015/0373107 A1 Dec. 24, 2015

Related U.S. Application Data

(63) Continuation-in-part of application No. 14/043,034, filed on Oct. 1, 2013, which is a continuation-in-part of application No. 13/772,163, filed on Feb. 20, 2013, now Pat. No. 9,106,721.

(60) Provisional application No. 61/708,794, filed on Oct. 2, 2012.

(51) Int. Cl.
*H04L 29/08* (2006.01)
*G06F 17/30* (2006.01)
*H04W 4/00* (2009.01)

(52) U.S. Cl.
CPC .... *H04L 67/1095* (2013.01); *G06F 17/30575* (2013.01); *H04W 4/003* (2013.01)

(58) Field of Classification Search
CPC ............... G06F 17/30575; H04L 67/1095
See application file for complete search history.

(56) References Cited

U.S. PATENT DOCUMENTS 6,811,486 B1 11/2004 Luciano, Jr.
7,315,740 B2 1/2008 Maes
(Continued)

FOREIGN PATENT DOCUMENTS

EP 2 680 207 A1 1/2014

OTHER PUBLICATIONS

"How to Transfer Applications from IPhone to ITunes/PC" —Johanna Parker, IPhone to PC, May 2011 http://www.iphone-to-pc.com/how-transfer-iphone-apps-itunes-computer.html.*

(Continued)

*Primary Examiner* — Randy Scott
(74) *Attorney, Agent, or Firm* — Mattingly & Malur, PC

(57) ABSTRACT

An electronic device may offload an application to a network storage to free up storage on the electronic device. For instance, an application file and, in some cases, associated application data and/or saved application state information may be stored at the network storage and deleted from the electronic device. Subsequently, a data management module may receive an instruction to onload the application back onto the electronic device, such as in response to a user input that selects the offloaded application, a determination that an upcoming activity may include use of the offloaded application, or a determination that a user usage pattern indicates that the offloaded application is likely to be used. In response, the data management module may download the corresponding application file from the network storage. In some cases, the electronic device may also receive associated application data and/or saved application state information from the network storage.

17 Claims, 12 Drawing Sheets

(56) References Cited

U.S. PATENT DOCUMENTS

| | | |
|---|---|---|
| 7,326,117 B1 | 2/2008 | Best |
| 7,490,045 B1 | 2/2009 | Flores et al. |
| D611,494 S | 3/2010 | Akiyoshi et al. |
| 7,774,457 B1 | 8/2010 | Talwar et al. |
| 7,903,383 B2 | 3/2011 | Fukano et al. |
| 8,005,956 B2 | 8/2011 | Williams et al. |
| D646,695 S | 10/2011 | Hoggarth et al. |
| 8,234,348 B1 | 7/2012 | Tulchinsky et al. |
| 8,290,920 B2 | 10/2012 | Mahajan et al. |
| 8,315,977 B2 | 11/2012 | Anand et al. |
| 8,423,511 B1 | 4/2013 | Bhatia |
| D682,874 S | 5/2013 | Frijlink et al. |
| 8,438,298 B2 | 5/2013 | Arai et al. |
| D683,737 S | 6/2013 | Brinda et al. |
| 8,473,577 B2 | 6/2013 | Chan |
| 8,475,275 B2 | 7/2013 | Weston et al. |
| 8,478,816 B2 | 7/2013 | Parks et al. |
| 8,494,576 B1 | 7/2013 | Bye et al. |
| 8,495,129 B2 | 7/2013 | Wolman et al. |
| 8,515,902 B2 | 8/2013 | Savage |
| D689,505 S | 9/2013 | Convay et al. |
| 8,539,567 B1 | 9/2013 | Logue et al. |
| 8,577,292 B2 | 11/2013 | Huibers |
| 8,589,140 B1 | 11/2013 | Poulin |
| 8,606,948 B2 | 12/2013 | Evans et al. |
| 8,666,938 B1 | 3/2014 | Pancholy |
| 8,747,232 B1 | 6/2014 | Quan et al. |
| 8,764,555 B2 | 7/2014 | Quan et al. |
| 8,775,449 B2 | 7/2014 | Quan et al. |
| D710,878 S | 8/2014 | Jung |
| 8,812,601 B2 | 8/2014 | Hsieh et al. |
| 8,840,461 B2 | 9/2014 | Quan et al. |
| 8,868,859 B2 | 10/2014 | Schmidt et al. |
| D718,334 S | 11/2014 | Cranfill |
| 8,892,693 B2 | 11/2014 | Quan et al. |
| 8,913,056 B2 | 12/2014 | Zimmer et al. |
| 8,951,127 B2 | 2/2015 | Quan et al. |
| 8,954,611 B2 | 2/2015 | Chan et al. |
| 8,977,723 B2 | 3/2015 | Quan et al. |
| D726,753 S | 4/2015 | Angelides |
| D730,383 S | 5/2015 | Brinda et al. |
| D731,537 S | 6/2015 | Jeong et al. |
| D732,549 S | 6/2015 | Kim |
| D734,775 S | 7/2015 | Nagasawa et al. |
| D736,822 S | 8/2015 | Tursi et al. |
| 9,095,779 B2 | 8/2015 | Chan et al. |
| 9,112,885 B2 | 8/2015 | Chan et al. |
| D737,852 S | 9/2015 | De La Rosa et al. |
| 9,152,401 B2 * | 10/2015 | Hayton ............... G06F 8/60 |
| 9,210,203 B2 | 12/2015 | Quan et al. |
| 9,268,655 B2 | 2/2016 | Chan et al. |
| 9,274,780 B1 | 3/2016 | Velummylum et al. |
| 9,374,407 B2 | 6/2016 | Quan et al. |
| 9,380,093 B2 | 6/2016 | Quan et al. |
| 2001/0039212 A1 | 11/2001 | Sawano et al. |
| 2002/0161908 A1 | 10/2002 | Benitez et al. |
| 2003/0069037 A1 | 4/2003 | Kiyomoto et al. |
| 2003/0078959 A1 * | 4/2003 | Yeung ............... G06F 8/62 |
| | | 709/201 |
| 2004/0018876 A1 | 1/2004 | Kubota et al. |
| 2004/0121837 A1 | 6/2004 | Chiang et al. |
| 2004/0203381 A1 | 10/2004 | Cahn et al. |
| 2005/0147130 A1 | 7/2005 | Hurwitz et al. |
| 2006/0030408 A1 | 2/2006 | Kiiskinen |
| 2006/0073788 A1 | 4/2006 | Halkka et al. |
| 2007/0130217 A1 | 6/2007 | Linyard et al. |
| 2008/0055311 A1 | 3/2008 | Aleksic et al. |
| 2008/0201705 A1 * | 8/2008 | Wookey ............... G06F 8/68 |
| | | 717/175 |
| 2008/0220878 A1 | 9/2008 | Michaelis |
| 2009/0063690 A1 | 3/2009 | Verthein et al. |
| 2009/0077263 A1 | 3/2009 | Koganti et al. |
| 2009/0106110 A1 | 4/2009 | Stannard et al. |
| 2009/0204966 A1 | 8/2009 | Johnson et al. |
| 2009/0282125 A1 | 11/2009 | Jeide et al. |
| 2010/0173712 A1 | 7/2010 | Buhr |
| 2010/0235511 A1 | 9/2010 | Kai |
| 2010/0257403 A1 | 10/2010 | Virk et al. |
| 2010/0332401 A1 | 12/2010 | Prahlad et al. |
| 2011/0076941 A1 | 3/2011 | Taveau et al. |
| 2011/0078319 A1 | 3/2011 | Ishida |
| 2011/0093567 A1 | 4/2011 | Jeon et al. |
| 2011/0106755 A1 | 5/2011 | Hao et al. |
| 2011/0126168 A1 | 5/2011 | Ilyayev |
| 2011/0219105 A1 | 9/2011 | Kryze et al. |
| 2011/0252071 A1 | 10/2011 | Cidon |
| 2011/0275316 A1 | 11/2011 | Suumäki et al. |
| 2011/0286026 A1 | 11/2011 | Matsuzawa |
| 2011/0313922 A1 | 12/2011 | Ben Ayed |
| 2012/0017236 A1 | 1/2012 | Stafford et al. |
| 2012/0023250 A1 | 1/2012 | Chen et al. |
| 2012/0028714 A1 | 2/2012 | Gagner et al. |
| 2012/0036218 A1 | 2/2012 | Oh et al. |
| 2012/0036239 A1 | 2/2012 | Donaghey et al. |
| 2012/0064908 A1 | 3/2012 | Fox et al. |
| 2012/0069131 A1 | 3/2012 | Abelow |
| 2012/0079095 A1 | 3/2012 | Evans et al. |
| 2012/0084803 A1 | 4/2012 | Johansson et al. |
| 2012/0110568 A1 | 5/2012 | Abel et al. |
| 2012/0128172 A1 | 5/2012 | Alden |
| 2012/0149309 A1 | 6/2012 | Hubner et al. |
| 2012/0171951 A1 | 7/2012 | 't Hooft |
| 2012/0203932 A1 | 8/2012 | da Costa et al. |
| 2012/0210343 A1 | 8/2012 | McCoy et al. |
| 2012/0278439 A1 | 11/2012 | Ahiska et al. |
| 2012/0290717 A1 * | 11/2012 | Luna ............... H04L 67/1095 |
| | | 709/224 |
| 2012/0303778 A1 | 11/2012 | Ahiska et al. |
| 2013/0007203 A1 | 1/2013 | Szu |
| 2013/0044106 A1 | 2/2013 | Shuster et al. |
| 2013/0045795 A1 | 2/2013 | Fiedler |
| 2013/0080964 A1 | 3/2013 | Shigeta |
| 2013/0086114 A1 | 4/2013 | Wilson et al. |
| 2013/0117806 A1 | 5/2013 | Parthasarathy et al. |
| 2013/0159890 A1 | 6/2013 | Rossi |
| 2013/0219381 A1 | 8/2013 | Lovitt |
| 2013/0223240 A1 | 8/2013 | Hayes et al. |
| 2013/0225087 A1 | 8/2013 | Uhm |
| 2013/0304898 A1 | 11/2013 | Aggarwal et al. |
| 2013/0326499 A1 * | 12/2013 | Mowatt ............... G06F 8/60 |
| | | 717/177 |
| 2013/0339058 A1 | 12/2013 | Gotlib et al. |
| 2014/0040239 A1 | 2/2014 | Hirsch |
| 2014/0053054 A1 | 2/2014 | Shen et al. |
| 2014/0095734 A1 | 4/2014 | Quan et al. |
| 2014/0101300 A1 | 4/2014 | Rosensweig et al. |
| 2014/0136481 A1 | 5/2014 | Quan et al. |
| 2014/0170978 A1 | 6/2014 | Wolman et al. |
| 2014/0215030 A1 | 7/2014 | Terwilliger et al. |
| 2014/0221093 A1 | 8/2014 | Quan et al. |
| 2014/0245203 A1 | 8/2014 | Lee et al. |
| 2014/0289201 A1 | 9/2014 | Chan et al. |
| 2014/0289331 A1 | 9/2014 | Chan et al. |
| 2014/0379853 A1 | 12/2014 | Shelton |
| 2015/0032889 A1 | 1/2015 | Chan et al. |
| 2015/0286388 A1 | 10/2015 | Jeon et al. |
| 2015/0326655 A1 | 11/2015 | Quan et al. |
| 2015/0365463 A1 | 12/2015 | Quan et al. |
| 2015/0365817 A1 | 12/2015 | Chu et al. |
| 2015/0367238 A1 | 12/2015 | Perrin et al. |
| 2015/0370428 A1 | 12/2015 | Chan et al. |

OTHER PUBLICATIONS

Notice of Allowance mailed Nov. 4, 2015, for U.S. Appl. No. 14/158,733, of Quan, J., et al., filed Jan. 17, 2014.

Ex Parte Quayle Action mailed Dec. 3, 2015, for U.S. Appl. No. 29/486,424, of Chan, M. A., et al., filed Mar. 28, 2014.

Notice of Allowance mailed Jan. 11, 2016, for U.S. Appl. No. 14/042,398, of Chan, M.A., et al., filed Sep. 30, 2013.

Notice of Allowance mailed Feb. 12, 2016, for U.S. Appl. No. 13/865,515, of Quan, J., et al., filed Apr. 18, 2013.

Notice of Allowance mailed Feb. 12, 2016, for U.S. Appl. No. 14/228,190, of Quan, J., et al., filed Mar. 27, 2014.
Final Office Action mailed Feb. 26, 2016, for U.S. Appl. No. 14/042,509, of Chan, M.A., et al., filed Sep. 30, 2013.
Final Office Action mailed Feb. 29, 2016, for U.S. Appl. No. 14/043,034, of Quan, J., et al., filed Oct. 1, 2013.
Non-Final Office Action mailed Jun. 8, 2016, for U.S. Appl. No. 14/840,611, of Chan, M.A., et al., filed Aug. 31, 2015.
Final Office Action mailed Jun. 17, 2016, for U.S. Appl. No. 14/042,567, of Chan, M.A., et al., filed Sep. 30, 2013.
Notice of Allowance mailed Aug. 3, 2016, for U.S. Appl. No. 29/486,424, of Chan, M.A., et al., filed Mar. 28, 2014.
Non-Final Office Action mailed Aug. 12, 2016, for U.S. Appl. No. 14/221,174, of Chan, M.A., et al., filed Mar. 20, 2014.
Non-Final Office Action mailed Sep. 12, 2016, for U.S Appl. No. 14/042,509, of Chan, M.A., et al., filed Sep. 30, 2013.
Non Final Office Action mailed Sep. 19, 2016, for U.S. Appl. No. 14/043,034, of Quan, J., et al., filed Oct. 1, 2013.
International Search Report and Written Opinion mailed Feb. 3, 2014, 7 pp., for International Application No. PCT/US2013/062729 filed Sep. 30, 2013.
International Search Report and Written Opinion mailed Feb. 3, 2014, 9 pp., for International Application No. PCT/US2013/062986 filed Oct. 2, 2013.
International Search Report and Written Opinion mailed Feb. 3, 2014, 7 pp., for International Application No. PCT/US2013/062737 filed Sep. 30, 2013.
International Search Report and Written Opinion mailed Sep. 11, 2014, 6 pps., for International Application No. PCT/US2014/031488 filed Mar. 21, 2014.
Kevin, "Android Automatic App Updates Part 2," Worldstart's Tech Tips and Computer Help, dated Apr. 10, 2012, Retrieved from the Internet URL: http://www.worldstart.com/android-automatic-app-updates-part-2/, retrieved on Oct. 22, 2015, pp. 1-3.
Khan, S., "ZDBox for Android Is All-In-One Toolkit to Monitor and Manage Device," dated Mar. 4, 2011, Retrieved from the Internet URL: http://www.addictivetips.com/mobile/zdbox-for-android-is-all-in-one-toolkit-to-monitor-and-manage-device/, retrieved on Oct. 27, 2015, pp. 1-6.
Layton, J.B., "User Space File Systems," Linux Magazine, accessed at http://www.linux-mag.com/id/7814, Jun. 22, 2010, pp. 1-4.
McCormick, Z. and Schmidt, D. C., "Data Synchronization Patterns in Mobile Application Design," Vanderbilt University, pp. 1-14 (2012).
Nickinson, P., "Add a signature in gmail," Android Central, dated Nov. 29, 2010, Retrieved from the Internet URL: http://www.androidcentral.com/add-signature-gmail, retrieved on Oct. 26, 2015, pp. 1-10.
U.S. Design U.S. Appl. No. 29/486,424 by Chan, M.A., et al., filed Mar. 28, 2014.
Non-Final Office Action mailed Mar. 7, 2014, for U.S. Appl. No. 14/158,715, by Quan, J., et al., filed Jan. 17, 2014.
Non Final Office Action mailed Mar. 10, 2014, for U.S. Appl. No. 14/173,680, by Quan, J., et al., filed Feb. 5, 2014.
Non-Final Office Action mailed Apr. 2, 2014, U.S. Appl. No. 14/179,709 by Quan, J., et al., filed Feb. 13, 2014.
Non-Final Office Action mailed Apr. 3, 2014, U.S. Appl. No. 14/158,682 by Quan, J., et al., filed Jan. 17, 2014.
Notice of Allowance mailed Apr. 15, 2014, for U.S. Appl. No. 14/167,834, by Quan, J., et al., filed Jan. 29, 2014.
Non-Final Office Action mailed May 8, 2014, for U.S. Appl. No. 14/179,744 by Quan, J., et al., filed Feb. 13, 2014.
Non-Final Office Action mailed May 9, 2014, for U.S. Appl. No. 14/160,444 by Quan, J., et al., filed Jan. 21, 2014.
Notice of Allowance mailed May 14, 2014, for U.S. Appl. No. 14/158,715, by Quan, J., et al., filed Jan. 17, 2014.
Notice of Allowance mailed May 20, 2014, for U.S. Appl. No. 14/173,680, by Quan, J., et al., filed Feb. 5, 2014.
Non-Final Office Action mailed May 27, 2014, U.S. Appl. No. 14/158,733 by Quan, J., et al., filed Jan. 17, 2014.
Non-Final Office Action mailed Jun. 9, 2014, for U.S. Appl. No. 14/167,939 by Quan, J., et al., filed Jan. 29, 2014.
Final Office Action mailed Jul. 24, 2014, for U.S. Appl. No. 14/179,709 by Quan, J., et al., filed Feb. 13, 2014.
Notice of Allowance mailed Aug. 12, 2014, for U.S. Appl. No. 14/179,709 by Quan, J., et al., filed Feb. 13, 2014.
Non-Final Office Action mailed Aug. 26, 2014, for U.S. Appl. No. 14/267,823 by Chan, M.A., et al., filed May 1, 2014.
Notice of Allowance mailed Sep. 3, 2014, for U.S. Appl. No. 14/160,444 by Quan, J., et al., filed Jan. 21, 2014.
Non Final Office Action mailed Oct. 23, 2014, for U.S. Appl. No. 14/252,674 by Chan, M.A., et al., filed Apr. 14, 2014.
Notice of Allowance mailed Oct. 29, 2014, for U.S. Appl. No. 14/167,939 by Quan, J., et al., filed Jan. 29, 2014.
Notice of Allowance mailed Oct. 29, 2014, for U.S. Appl. No. 14/179,744 by Quan, J., et al., filed Feb. 13, 2014.
Non Final Office Action mailed Nov. 3, 2014, for U.S. Appl. No. 13/772,163 by Quan, J., filed Feb. 20, 2013.
Final Office Action mailed Nov. 6, 2014, U.S. Appl. No. 14/158,682 by Quan, J., et al., filed Jan. 17, 2014.
Notice of Allowance mailed Nov. 25, 2014, for U.S. Appl. No. 14/252,674 by Chan, M.A., et al., filed Apr. 14, 2014.
Non Final Office Action mailed Dec. 3, 2014, for U.S. Appl. No. 14/251,463 by Quan, J., et al., filed Apr. 11, 2014.
Notice of Allowance mailed Dec. 4, 2014, for U.S. Appl. No. 14/479,140 by Chan, M.A., et al., filed Sep. 5, 2014.
Notice of Allowance mailed Dec. 12, 2014, for U.S. Appl. No. 14/479,140 by Chan, M.A., et al., filed Sep. 5, 2014.
Notice of Allowance mailed Dec. 17, 2014, for U.S. Appl. No. 14/267,823 by Chan, M.A., et al., filed May 1, 2014.
Notice of Allowance mailed Dec. 19, 2014, for U.S. Appl. No. 14/479,140 by Chan, M.A., et al., filed Sep. 5, 2014.
Notice of Allowance mailed Dec. 22, 2014, for U.S. Appl. No. 14/179,744 by Quan, J., et al., filed Feb. 13, 2014.
Final Office Action mailed Dec. 23, 2014, for U.S. Appl. No. 14/158,733 by Quan, J., et al., filed Jan. 17, 2014.
Notice of Allowance mailed Mar. 17, 2015, for U.S. Appl. No. 14/158,733, Quan, J., et al., filed Jan. 17, 2014.
Notice of Allowance mailed Mar. 30, 2015, for U.S. Appl. No. 13/772,163, Quan, J., filed Feb. 20, 2013.
Notice of mailed on Mar. 30, 2015, for U.S. Appl. No. 14/267,823, Chan, M.A., et al., filed on May 1, 2014.
Non-Final Office Action mailed Apr. 8, 2015, for U.S. Appl. No. 13/865,515, Quan, J., et al., filed Apr. 18, 2013.
Non-Final Action mailed Apr. 8, 2015, for U.S. Appl. No. 14/228,190, Quan, J., et al., filed on Mar. 27, 2014.
Notice of Allowance mailed on Apr. 15, 2015, for U.S. Appl. No. 14/479,140, Chan, M.A., et al., filed on Sep. 5, 2014.
Non-Final Office Action mailed May 15, 2015, for U.S. Appl. No. 14/042,398, by Chan, M.A., et al., filed Sep. 30, 2013.
Non-Final Office Action mailed Jun. 22, 2015, for U.S. Appl. No. 14/043,034, of Quan, J., et al., filed Oct. 1, 2013.
Non-Final Office Action mailed Jun. 22, 2015, for U.S. Appl. No. 14/158,682, of Quan, J., et al., filed Jan. 17, 2014.
Non-Final Office Action mailed Jul. 20, 2015, for U.S. Appl. No. 14/042,509, of Chan, M.A., et al., filed Sep. 30, 2013.
Notice of Allowance mailed Jul. 24, 2015, for U.S. Appl. No. 14/158,733, of Quan, J., et al., filed Jan. 17, 2014.
Non-Final Office Action mailed Aug. 21, 2015, for U.S. Appl. No. 14/042,567, of Chan, M.A., et al., filed Sep. 30, 2013.
Notice of Allowance mailed Sep. 2, 2015, for U.S. Appl. No. 14/042,398, of Chan, M.A., et al., filed Sep. 30, 2013.
Final Office Action mailed Sep. 9, 2015, for U.S. Appl. No. 14/251,463, of Quan, J., et al., filed Apr. 11, 2014.
Notice of Allowance mailed Oct. 2, 2015, for U.S. Appl. No. 14/228,190, of Quan, J., et al., filed Mar. 27, 2014.
Notice of Allowance mailed Oct. 7, 2015, for U.S. Appl. No. 13/865,515, of Quan, J., et al., filed Apr. 18, 2013.

* cited by examiner

MANAGING APPLICATIONS ON AN ELECTRONIC DEVICE

CROSS-REFERENCES TO RELATED APPLICATIONS

This application is a continuation-in-part of U.S. patent application Ser. No. 14/043,034, entitled "APPLICATION STATE BACKUP AND RESTORATION ACROSS MULTIPLE DEVICES", which was filed on Oct. 1, 2013, which is a continuation-in-part of U.S. patent application Ser. No. 13/772,163, entitled "APPLICATION STATE SYNCHRONIZATION ACROSS MULTIPLE DEVICES", filed on Feb. 20, 2013, which claims the benefit of U.S. Provisional Patent Application No. 61/708,794, entitled "CLOUD COMPUTING INTEGRATED OPERATING SYSTEM", which was filed on Oct. 2, 2012, all of which applications are incorporated by reference herein.

BACKGROUND

People use electronic devices for communication, socializing, entertainment, work, navigation, web browsing, and a variety of other functions. However, electronic devices typically have limited storage space, thus restricting the amount of data that a user may maintain on a particular electronic device. For example, people often keep various different types of digital content items on their electronic devices, such as photographs, videos, music, and so forth, and like to have sufficient free storage space to allow addition of more content items when desired without having to first delete existing content items. Furthermore, people may often have many applications installed on their electronic devices. Some of these applications and the associated application data may take up a considerable amount of storage space, while being used relatively infrequently.

SUMMARY

Some implementations herein include techniques and arrangements for managing applications available to a user on an electronic device. For instance, an electronic device may offload an application file and, in some cases, associated application data and/or application state information, to a network storage to free up storage space on the electronic device. Thus, in some examples, the application may be uninstalled from the electronic device or otherwise offloaded and deleted from the electronic device. Applications may be onloaded back onto the device in response to a condition including at least one of: a user input that selects an offloaded application; a determination of an upcoming activity may include use of an offloaded application; a determination that a user usage pattern indicates that a particular offloaded application is likely to be used soon; or other determined information, as discussed below.

In response to determining that a particular application is to be onloaded onto the electronic device, the electronic device may send a request to the network storage for the corresponding application file. The application may be onloaded, such as by reinstalling the application and/or by transferring an application file from the network storage to the storage of the electronic device. Further, in some examples, the electronic device may receive from the network storage at least one of associated application data or application state information for the application being onloaded. In other examples, the application data and/or application state information may have been retained on the electronic device and may be used to restore the application after the application is onloaded onto the electronic device. Thus, the application may be restored to its former state and executed on the electronic device.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
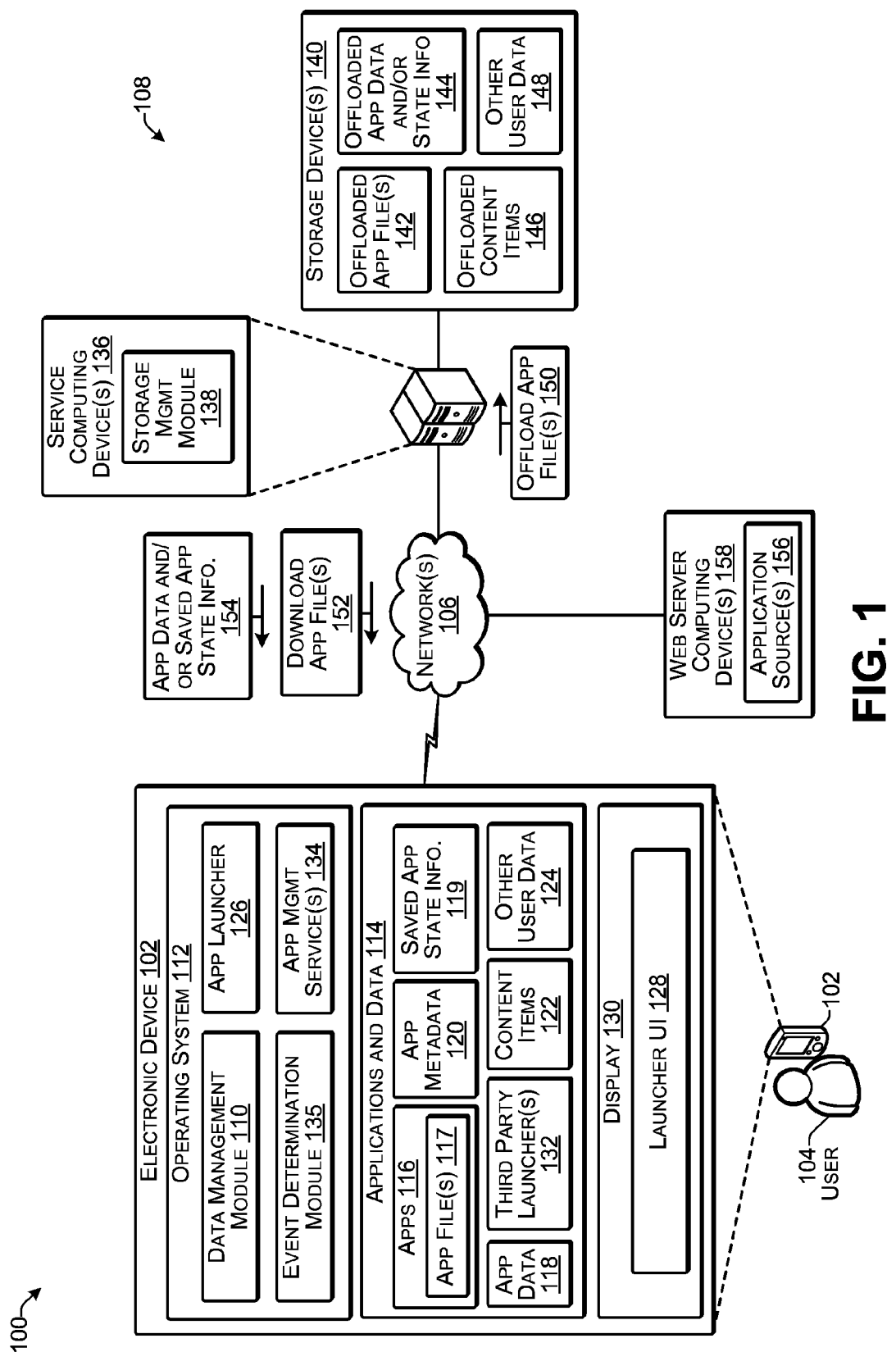
FIG. 1 illustrates an example system for enabling application management on an electronic device according to some implementations.

Some examples herein are directed to management of applications on an electronic device. For example, a data management module on the electronic device may dynamically manage the amount of available storage on the electronic device by removing user data such as certain applications, associated application data, and/or certain content items from the storage of the electronic device, and offloading this user data at least temporarily to a network storage location. An offloaded application may be onloaded back onto the electronic device in response to at least one of: a user input that selects the offloaded application; a determination of an upcoming event that may include use of the offloaded application; a determination that a user usage pattern indicates that the offloaded application is likely to be used in the near future; or other information indicating an offloaded application may be used soon. Further, in some examples, an emulator may execute an offloaded application at a service computing device to enable the receipt, by the electronic device, of notifications for certain applications that have been offloaded from the electronic device.

User data comprising content items, applications, and application data typically may consume the largest amount of storage on an electronic device. The electronic device herein may offload a portion of the user data when heuristics indicate that particular applications and/or content items are likely to not be used by the user in the near term. For instance, a data management module may determine which applications or content items a user is likely to use at what times and on what days, and may offload or onload certain user data based on predicted usage patterns. The offloading and onloading of the user data may typically take place in the background without any user interaction to provide a seamless user experience. The applications and application data may be offloaded or onloaded based on the techniques described herein. In some examples, the digital content items may be offloaded and/or onloaded based on the techniques described in U.S. patent application Ser. No. 14/835,993, entitled "MANAGING CONTENT ON AN ELECTRONIC DEVICE", filed Aug. 26, 2015, which is incorporated by reference herein.

The data management module may offload a particular application based on application usage patterns of the user, the detection of an upcoming event, or lack thereof, and/or based on other criteria, as discussed below. In some examples, the application that is being offloaded may be uninstalled from the electronic device, and an application file may be sent to the network storage that may be used to reinstall the application during onloading. In other examples, one or more application files of the application may be removed from the electronic device and sent to the network storage without uninstalling the application from the electronic device.

Further, in some examples, the application data associated with the application and/or saved application state information obtained during execution of the application may also be offloaded to the network storage. In other examples, the application data associated with the application and/or the saved application state information may be retained on the electronic device when the application is offloaded. For instance, the data management module might not completely uninstall and remove all information associated with an application from the electronic device when offloading the application. Rather, the data management module may leave on the electronic device at least one of application data, saved application state information, or metadata for the application. The application metadata may include, for example, an application icon or other representation of the application, and other metadata associated with the application, such as an application file name, application version, application size, size of the associated application data, and so forth.

In some situations, the data management module may decide which applications to offload and onload. In other situations, the data management module may receive an instruction to onload an application, such as from an application launcher or other UI that receives a user input. Further, in some examples, the data management module may receive information about an upcoming event from an event determination module and/or information about an application that may be used during the event. In any of these cases, in response to determining that an application is to be onloaded back onto the electronic device, the data management module may begin onloading the application. For example, the data management module may send a request to the network storage for a corresponding application file and, in some cases, the offloaded application data and/or saved state information associated with the requested application.

As one example of onloading an application, the data management module may download, from the network storage, an application file that was previously sent to the network storage by the data management module. In some examples, the associated application data and/or saved application state information is also downloaded from the network storage. The data management module may use the downloaded application file to reinstall the application and restore the application data and application state for the application.

As another example of onloading an application, the data management module may download, from the network storage, an application file that was previously sent to the network storage by the data management module. In this example, however, the application file may be saved to the storage of the electronic device and may be restored and executed without reinstallation of the downloaded application file. In either case, the data management module may restore the application to its most recent state using the previously saved application state information, which may be downloaded contemporaneously with the application file and/or application data, or which may have been retained on the electronic device while the application file was offloaded.

In some examples, when an application is uninstalled for offloading, the data management module may generate an application file that can be used to reinstall the same version of the application back onto the electronic device. Thus, the data management module may generate a custom and more precise version of the application file that can be used to reinstall the application onto the electronic device when the application is onloaded to the electronic device. For example, an application file received from a developer or application store may typically include elements used for a variety of different types of devices, such as smart phones, tablets, and so forth. In some cases, the elements used for a tablet may be significantly different from the elements used for a smart phone, such as different resolution images, different control features, or the like. If the user installs the application on, e.g., a smartphone, then the tablet-oriented elements of the application will not be used and merely consume additional storage space. Thus, when the data management module generates a custom application file during offloading of the application, the custom application file may be smaller in size than the original application file since the custom application file may only include elements actually useable by the particular electronic device on which the application is installed. The smaller size enables the custom application file to be more quickly moved between the electronic device and network storage.

In addition, in some examples, an emulator may be executed on the service computing device to emulate the electronic device. For example, an offloaded application may be installed on the emulator, and may be restored to a recent state using the offloaded application data and application state information. The offloaded application executed on the emulator may function in the same manner as the application functioned on the electronic device. Accordingly, as one example, the application may communicate with an external resource, such as a website, and may receive application information therefrom, such as notifications, messages, posts, or the like. When the application on the emulator receives a notification, message, or other application information, this information may be forwarded by the service computing device to the electronic device, such as for presentation on the electronic device as a notification associated with the offloaded application.

For discussion purposes, some example implementations are described in the environment data management including offloading and subsequently onloading applications and associated data on the electronic device for conserving storage space on the electronic device with minimal disruption to the user experience. However, implementations herein are not limited to the particular examples provided, and may be extended to other types of devices, other execution environments, other system architectures, other even determination techniques, and so forth, as will be apparent to those of skill in the art in light of the disclosure herein.

FIG. 1 illustrates an example system 100 for enabling management of applications according to some implementations. For instance, the system 100 may enable an electronic device 102 associated with a user 104 to communicate over one or more networks 106 with a network storage 108. The electronic device 102 may be any suitable type of computing device, e.g., mobile, semi-mobile, semi-stationary, or stationary. Some examples of the electronic device 102 may include cellular phones, smart phones, tablet computing devices, wearable computing devices, body-mounted computing devices, and other types of mobile devices; laptops, netbooks, and other mobile computers or semi-mobile computers; desktop computing devices, terminal computing devices and other semi-stationary or stationary computing devices; augmented reality devices, gaming systems, or any of various other computing devices capable of storing data, sending communications, and performing the functions according to the techniques described herein. Further, while a single user 104 and associated electronic device 102 are illustrated in this example, in other examples, there may be a large number of users 104, each having one or more respective electronic devices 102.

The electronic device 102 may include a data management module 110 that executes on the electronic device 102. The data management module 110 may be executable code or other executable instructions that provide data management functionality to the electronic device 102 for controlling which applications and/or content items are maintained locally on the electronic device 102 and which are offloaded, at least in part. In some examples, the data management module 110 may be an application or other module that is part of an operating system (OS) 112 on the electronic device 102. In other examples, the data management module 110 may be one or more modules that are separate from the OS 112, such as may be included in one or more applications executable on the electronic device 102. For instance, the data management module 110 may have permission for system-level access to user applications and/or data stored on the electronic device 102. Thus, the data management module 110 may be an application that the user may be able to see and access via an application launcher, such as for adjusting settings of the data management module 110. Alternatively, the data management module 110 may be an application separate from the OS 112 that the user cannot see and/or access. As still another alternative, the data management module 110 may be implemented as a module of the OS 112 that is not accessible to the user. In addition, while the data management module 110 is illustrated in this example as residing on the electronic device 102, in other examples, at least some of the functionality of the data management module 110 may reside on another suitable computing device.

The electronic device 102 may further include applications and data 114, which may include one or more applications (apps) 116 that are installed and maintained on the electronic device 102. Each application 116 may include one or more application files 117, such as at least one application file including components for the executable application. In some examples, the application files 117 may be or may include application files that are installable for execution on the electronic device. Examples of installable application files include an APK file in the case of ANDROID® OS variants, an IPA file in the case of IOS® OS variants, or an XAP file in the case of WINDOWS® Phone OS variants; however, implementations herein are not limited to these examples.

Further, in some examples, the application files 117 may include application asset files that contain media or other content or data provided by the application developer. As one example, an OBB (opaque binary blob) file format is file that may be downloaded for use with an APK file. The OBB file is an expansion file that typically includes additional encrypted format data not stored in the main APK file, including graphics and media files. In some examples herein, the data management module 110 may remove an APK file and an associated OBB file from the electronic device 102 when performing an uninstallation of the application 116, associated application data 118, or saved application state information 119. Further, the data management module 110 may onload the application files 117, such as an APK file and an associated OBB file, such as by using an application programming interface (API) normally used as an updating tool, without performing a reinstallation of the APK file. Thus, implementations herein may be able to offload and onload application files 117 without having to perform uninstall and reinstall operations, which can save considerable time.

The applications and data 114 may further include the application data 118, which may be user application data that is associated with, generated by, and/or used by respective applications of the applications 116. For instance, each application 116 may have an associated portion of application data 118, respectively. In addition, the applications and data 114 may include saved application state information 119. For example, the data management module 110 may be configured to store the state of each application 116 each time the application 116 is accessed on the electronic device 102. Thus, for each application 116 that is used on the electronic device 102, the data management module 110 may take a snapshot of the application 116 when the user stops using the application 116 to obtain the most up-to-date state information. The saved application state information 119 may be saved incrementally as changes are made during use of the respective application 116. The data management module 110 may store this saved application state information 116 temporarily on the electronic device 102 and may subsequently backup the saved application state information 116 to the network storage 108 with other application data 118 information sent to the network storage 108. For instance, the app data 118 and saved application state information 119 may be backed up to the network storage 108 on a daily basis, such as overnight when the electronic device 102 might otherwise be in a standby mode. Further, in other examples, the app data 118 and saved application state information 119 may be retained on the electronic device 102 when the corresponding application 116 is offloaded from the electronic device 102.

In some examples, the applications and data 114 may further include application metadata 120, which may include metadata for local applications 116 currently installed and executable on the electronic device 102 as well as metadata for offloaded applications that are not currently executable unless onloaded. As one example, when an application is offloaded, application metadata 120 of the application may be left on the electronic device so that application launchers on the electronic device are able to determine that an offloaded application exists and is available to be restored onto the electronic device if selected by the user.

In addition, the applications and data 114 may include one or more content items 122. Examples of content items 122 may include digital photographs, images, videos, audio recordings, documents, books, movies, television shows, and the like. As mentioned above, the data management module 110 may manage the offloading and onloading of content items in addition to offloading and onloading applications and application data. The applications and data 114 may further include other types of user data 124 such as user profiles, user settings, user account information, user data used by the OS 112, and/or data used by other programs on the electronic device 102.

The OS 112 may further include an application launcher 126, which may be an OS application or other OS module that may present a launcher UI 128 to the user 104 on a display 130 associated with the electronic device 102. The application launcher 126 may be included on the electronic device 102 for launching execution of applications on the electronic device 102. The application launcher 126 may cause an application to launch on the electronic device regardless of whether the application is currently installed on the electronic device or has been offloaded to the network storage 108. In some cases, the launcher 126 may provide a visual indication as to which applications have been offloaded and which applications are currently fully installed on the electronic device 102. Further, if the user attempts to launch an application that has been offloaded, the data management module 110 may retrieve, reinstall or otherwise onload the application, and launch the application on the electronic 102 device in real time For example, as discussed below with respect to FIG. 3, the launcher UI 128 may enable the user 104 to search through the applications available to be opened on the electronic device 102. The launcher UI 128 may present information about applications 116 that are currently installed and executable on the electronic device 102, and also may present information about the applications that have been offloaded from the electronic device 102 to the network storage 108. Thus, the user 104 may use the launcher UI 128 to select an installed application 116 or an offloaded application for launching execution of the application on the electronic device 102. Additionally, in other examples, the application launcher 126 may be a native application that is separate from the OS 112, but configured for use with the OS 112 and the data management module 110, as discussed additionally below.

In some examples, the user may use the application launcher UI 128 to attempt to launch an application that has been offloaded from the electronic device to the network storage. For instance, as discussed below with respect to FIGS. 3-5, icons or other representations of applications that have been offloaded from the electronic device may be presented in the launcher UI along with representations of applications currently fully installed on the electronic device 102. In some cases, the representations of applications that have been offloaded may be visually distinguished in the launcher UI 128 from representations of applications that are currently installed on the electronic device 102. For instance, the representations of applications that have been offloaded may be presented in a graphical style that is distinct from the graphical style used for the representations of applications that are currently fully installed on the electronic device, such as by being grayed out, being presented with broken lines, being presented in a larger or smaller size, being presented in a different shape, being presented along with a graphic element, such as a cloud, or through any of various other graphical distinguishing techniques.

Furthermore, in some examples, the applications and data 114 may include one or more third party launchers 132. For example, an application launcher may serve the function of a start screen and/or home screen to organize a user's applications and data and to help the user to locate and start applications. In some examples, third party launchers may provide different application organization techniques, search features, or other customizable features that certain users may prefer over the native application launcher 126. Accordingly, implementations herein are configured to accommodate the use of a third party launcher 132 in addition to the native OS application launcher 126. In some cases, the third party launcher 132 may be an application 116 downloaded by the user 104, but is shown and referenced separately from the other applications 116 in this example for discussion purposes.

The display 130 may be used for presenting various types of visual information to the user 104, such as the launcher UI 128 provided by the launcher 126 or the third party launcher 132, as well as other UIs, content items, text, images, or other digital information. In addition, the OS 112 may include an application management service 134, which may include one or more OS services, APIs, or the like, for identifying and launching applications on the electronic device 102.

In addition, the OS 112 may include an event determination module 135 that may detect, identify, or otherwise determine events, and that may provide instructions to the data management module 110 for offloading or onloading applications based on the determined events. For example, the event determination module 135 may identify an upcoming event during which the user 104 may wish to have access to a particular offloaded application. For instance, suppose that the user's calendar indicates that the user will be taking a flight in the near future. The event determination module 135 may determine one or more applications recommended for the user 104 to have access to during the upcoming flight. The event determination module 135 may send an instruction to the data management module 110 to onload the recommended applications. Additional functions of the event determination module 135 are discussed below with respect to FIG. 7. Further, while several components and data of the electronic device 102 are described and illustrated in this example, numerous other components and data may be included in the electronic device 102, as discussed additionally below and/or as will be apparent to those of skill in the art having the benefit of the disclosure herein.

In the illustrated example, the network storage 108 includes one or more service computing devices 136 that include a storage management module 138. Further, the service computing device 136 may include, or may be in communication with, one or more storage devices 140, such as by direct connection or via the one or more networks 106. In some examples, the network storage 108 may be provided by a service provider. For instance, various service providers may provide commercial cloud storage or other network storage to the public, typically for a monthly or yearly fee based at least in part on the amount of storage space consumed by an individual user. However, implementations herein are not limited to commercial network storage services, and may be extended to other types of network-accessible storage and storage services. As several alternative examples, the network storage 108 may be a network-attached storage (NAS), a server computing device, a desktop computing device, or the like, such as may be maintained by the user 104 or other entity.

The one or more networks 106 can include any suitable network, including a wide area network, such as the Internet; a local area network, such as an intranet; a wireless network, such as a cellular network; a local wireless network, such as Wi-Fi; short-range wireless communications, such as BLUETOOTH®; a wired network, such as fiber or Ethernet; or any other suitable network, or any combination thereof. Accordingly, the one or more networks 106 may include both wired and/or wireless communication technologies. Components used for such communication technologies can depend at least in part upon the type of network and/or the environment selected. Protocols for communicating over such networks are well known and will not be discussed herein in detail. Accordingly, the electronic device 102 and the service computing device 136 are able to communicate over the one or more networks 106 using wired or wireless connections, and combinations thereof.

The storage management module 138 on the service computing device 136 may manage the storage of offloaded application files 142, offloaded application data and/or saved application state information 144, offloaded content items 146, and backed up other user data 148 of the user 104 stored on the storage devices 140. Further, the storage management module 138 may control access to the offloaded applications, data, and content items. In the case that the network storage 108 is provided by a commercial storage service, the storage devices 140 may be enterprise level storage arrays, such as may be maintained in a storage area network, a NAS cluster, a RAID (redundant array of independent disks) array, a distributed storage node array, or various other types of storage configurations. The storage devices 140 may store offloaded application files 142 that have been offloaded from the electronic device 102, as well as the associated application data and/or saved application state information 144. In addition, the storage devices 140 may store the offloaded content items 146 and the other user data 148, such as backup versions the user's profile, user settings, user account information, and/or various other types of user data, as enumerated elsewhere herein. In addition, in some examples, the storage devices 140 may store, with the application data 144, saved application state information for the offloaded application files 142. The data management module 110 may use the saved application state information to restore the applications to their most recent states when onloading the application files 142 back onto the electronic device 102.

In some implementations, the data management module 110 may dynamically manage the amount of available storage on the electronic device 102 by offloading some applications 116 from the electronic device 102. Thus, as indicated at 150, the data management module 110 may create space in the local storage by offloading one or more application files 117 from the electronic device 102 for storage at the network storage 108. Further, in some examples, the data management module 110 may also offload associated application data 118 and saved application state information 119. In some cases, the data management module 110 may automatically offload one or more of the applications 116 to the network storage 108, such as based on one or more user preferences or according to various heuristics such as based on detected patterns of usage. In other cases, prior to moving one or more application files 117 off the electronic device 102, the data management module 110 may present the user 104 with a list of applications to be offloaded and/or onloaded, and the user 104 may approve, disapprove, or otherwise determine the applications to be offloaded/onloaded from the electronic device 102. Similarly, based on a prediction that the user will want to use one or more applications, as indicated at 152, the data management module 110 may automatically onload one or more application files 142 and, in some cases, as indicated at 154, associated application data and/or saved application state information.

In some examples, the data management module 110 may identify an application 116 that is not expected to be used for at least some predictable period of time. For instance, the data management module 110 may identify an application that the user has only used on the weekends, e.g., Saturday and Sunday, and not on weekdays such as Monday through Friday. Based at least in part on this determination, on Monday mornings the data management module 110 may offload at least one application file 117 of the application and, in some examples, the associated application data 118 and/or saved application state information 119 to the network storage 108. Subsequently, on Friday evenings, the data management module 110 may download and restore the application file on the electronic device 102.

In some examples, the application data 118 and the saved application state information 119 may remain on the electronic device 102 during the time that the application is offloaded. In other examples, the application data 118 and/or the saved application state information 119 may be offloaded with the application file 117 and then onloaded with the application file during onloading of the application. In some examples, multiple application files 117 may be offloaded for a particular application 116, such as an application file including code of at least some executable components of the application (e.g., an APK file) and one or more application asset files (e.g., an OBB file). The multiple offloaded files 117 may then be subsequently onloaded back onto the electronic device 102 during onloading.

Additionally, in some cases, an application may be uninstalled for offloading. Following uninstallation of the application, an installable application file 117 (e.g., an APK file) may remain on the electronic device 102. The application file 117 may be sent to the network storage 108 and deleted from the storage of the electronic device 102. In some cases, the contents of the application file 117 may be the same as a file received from the application source 156 when the application was installed. In other examples, when the application is uninstalled for offloading, the data management module 110 may generate a custom installable application file 117 that can be used to reinstall the same version of the application back onto the electronic device 102. For instance, the data management module 110 may generate a custom version of the application file 117 that is smaller than the original application file received from the application source 156.

For example, an application file 117 received from a developer or application store may typically include elements used for a variety of different types of devices, such as smart phones, tablets, and so forth. In some cases, the elements used for a tablet may be significantly different from the elements used for a smart phone, such as different resolution images, different control features, or the like.

Consequently, if the electronic device is a smartphone, then the tablet elements of the application file 117 are not used, and merely consume additional storage space on the electronic device. Thus, the data management module 110 may generate a custom application file 117 during uninstalling of the application. For instance, the custom application file 117 may be smaller in size than the original application file since the custom application file may only include elements actually used by the particular electronic device 102 on which the application is installed. The smaller size enables the custom application file 117 to be more quickly moved between the electronic device and network storage, or vice versa.

The data management module 110 may observe application usage by the user 104 to determine application usage patterns for the user 104 with the respect to particular onloaded applications 116 and offloaded applications. In addition, the data management module 110 may use the observed usage patterns to determine when to download an offloaded application file 142 back on to the electronic device 102. The offloading and onloading of application files and application data may normally take place in the background without user action. Further, in the case that that user attempts to access a particular application that is not currently maintained on the storage of the electronic device 102, such as via the application launcher 126, the data management module 110 may be configured to onload the particular application right away. Depending in part on the connection speed to the network storage 108, this may take place in real time following the user selection of the particular application.

The data management module 110 may take into consideration one or more criteria when determining which applications 116 to offload or onload, or to recommend for offloading or onloading. For instance, application size may be generally static, while the size of application data may vary from person to person and application to application. As an example, a photo editing application may be generally the same size on the electronic devices of all users, but the size of the application data associated with the photo editing application may vary dramatically from user to user. Accordingly, the criteria may take into consider the size of both the application files 117 and the associated application data 118 when selecting applications 116 and application data 118 to onload or offload.

In some cases, the data management module 110 may employ one or more observed user data usage patterns, priority rules, expressed user preferences, or other application ranking techniques when determining applications to offload or onload. The data management module 110 may determine which applications 116 are likely to be used by the user 104 in the near future and which applications 116 may be offloaded. As one example, the data management module 110 may rank the applications 116, based at least in part on how recently each application has been used, how often each application is used, how much storage space each application uses, or a combination thereof. For instance, certain applications that are used less frequently and/or that utilize a large amount of storage space may be automatically offloaded to the network storage location or recommended for offloading. Thus, an application may be offloaded based on expiration of a threshold length of time since the last use, based on how infrequently the application has been used over a period of time, based on the application using a threshold amount of storage space, based on the amount of storage space remaining on the electronic device falling below a threshold level, or the like.

As another example, the data management module 110 may select one or more applications for offloading or onloading based on upcoming events or lack thereof as determined by the event determination module 135. For instance, if a user typically uses certain applications on a flight, during travel, or during similar event categories, the event determination module 135 may recommend that those applications 116 and associated application data 118 be offloaded if the user 104 does not have any upcoming travel scheduled. On the other hand, if the user's calendar shows a flight scheduled, the event determination module 135 may send an instruction to the data management module 110 to onload these applications onto the electronic device prior to the flight. In some cases, the offloading and onloading may take place when the electronic device is otherwise not in use, such as when the electronic device 102 is in a standby mode, connected to Wi-Fi, and plugged in to a power source. Some application metadata 120 corresponding to each of the offloaded applications may be maintained at the electronic device 102, such as for maintaining user settings, an application icon, and/or other information about the offloaded application.

The storage management module 138 at the network storage 108 may receive an offloaded application file 142 and the associated application data 144 and may store these in association with a user account associated with the user 104 and/or the electronic device 102. As one example, a copy of the application file 117 and associated application data 118 may be stored at the network storage 108 in association with a cloud storage account of the user 104 of the electronic device 102. In some cases, the electronic device 102 may send a copy of the application file 117 to the storage management module 138 before, during, or following installation of the application on the electronic device 102. For example, the data management module 110 on the electronic device 102 may receive the application file 117 initially from an application source 156, such as an application store or other application provider, e.g., on a web server computing device 158 or the like.

When the application is offloaded at a later point in time, in some examples, the offloading may not include the actual sending of the application file 117 at the later point in time, since the application file 117 may be already stored at the network storage 108 for each application installed on the electronic device 102. Alternatively, in some examples, when an application is offloaded, the storage management module 138 may obtain a corresponding application file for the offloaded application from the application source 156 rather than from the electronic device 102. For example, by obtaining the application file 117 in advance from the electronic device 102 or from a separate source 156, the offloading/onloading process can be shortened substantially because the onloading of a first application does not have to wait for the transfer of an application file of a second application being offloaded to be completed.

Subsequently, when the user 104 of the electronic device 102 attempts to execute an offloaded application, or when the data management module 110 otherwise determines to onload an offloaded application, the data management module 110 may request that the storage management module 138 send the corresponding offloaded application file 142 to the electronic device 102. As indicated at 152, the offloaded application file 142 may be sent to the electronic device 102 for onloading. In addition, in some examples, as indicated at 154, the associated application data and/or saved application state information may be sent to the electronic device 102 for restoring the onloaded application on the electronic device 102. After the application has been onloaded onto the electronic device 102, execution of the application on the electronic device 102 may be initiated using the saved application state information 119 and the corresponding application data 118, so that the onloaded application may begin execution in a state at which the user last used the application.

In some examples, during onloading of an offloaded application onto the electronic device 102, the saved application state information 119 for the application may be sent to the electronic device 102 by the network storage 108. In other examples, the saved application state information 119 may also be retained on the electronic device 102 regardless of whether the application file 117 had been offloaded and/or a copy of the application state information 119 is also backed up to the network storage. The content of the application state information 119 depends at least in part on the particular application that is being executed. Some examples of application state information 119 may include values for various variables used by the applications 116, values for most recent application settings and graphic user interface configurations, values for recently received user inputs or other user selections, and so forth. Thus, the saved state information 119 for an application may include the stored information to which the application has access at a point in time, essentially creating a snapshot of the application at the point in time.

In some cases, the application state information 119 may be obtained implicitly from the application 116 by causing the application 116 to save its current state. For instance, some applications 116 are configured to save their current states to an application folder or other persistent location when the applications 116 are sent to background processing. For example, application development frameworks for mobile electronic devices may require that application developers cause certain functions to take place in response to certain conditions, such as causing an application to save its state to a persistent memory location when the application is sent to the background. As one example, the use of a "moveTaskToBack" command (or any other suitable OS command that has a similar effect of moving a process to background processing) may cause an application 116 to save its current state information to a persistent memory location, e.g., as saved application state information 119 associated with the particular application 116.

Alternatively, as another example, one or more of the applications 116 may be configured by the application developers to save their respective current states in response to receiving an explicit "save state" command from the data management module 110. For example, an application developer may configure the application 116 to respond to receipt of a save state command by saving the application state information of the application 116 to a specified location. The application state information may then be retrieved from the specified location, stored in association with the application, and/or backed up to the network storage 108 as the saved application state information 119.

The data management module 110 or another OS module may cause the recently onloaded application 116 on the electronic device 102 to start execution using the corresponding saved application state information 119. For instance, the application 116 may be started using the saved variables, settings, and GUIs that were in place in the application 116 at a point at which execution of the application 116 last left off on the electronic device 102. Accordingly, the selected application 116 is restored to its previous state so that the process of offloading the application from the electronic device and onloading the application back onto the electronic device does not affect the user's prior settings, screen configurations, or the like, for the application.

Figure 2:
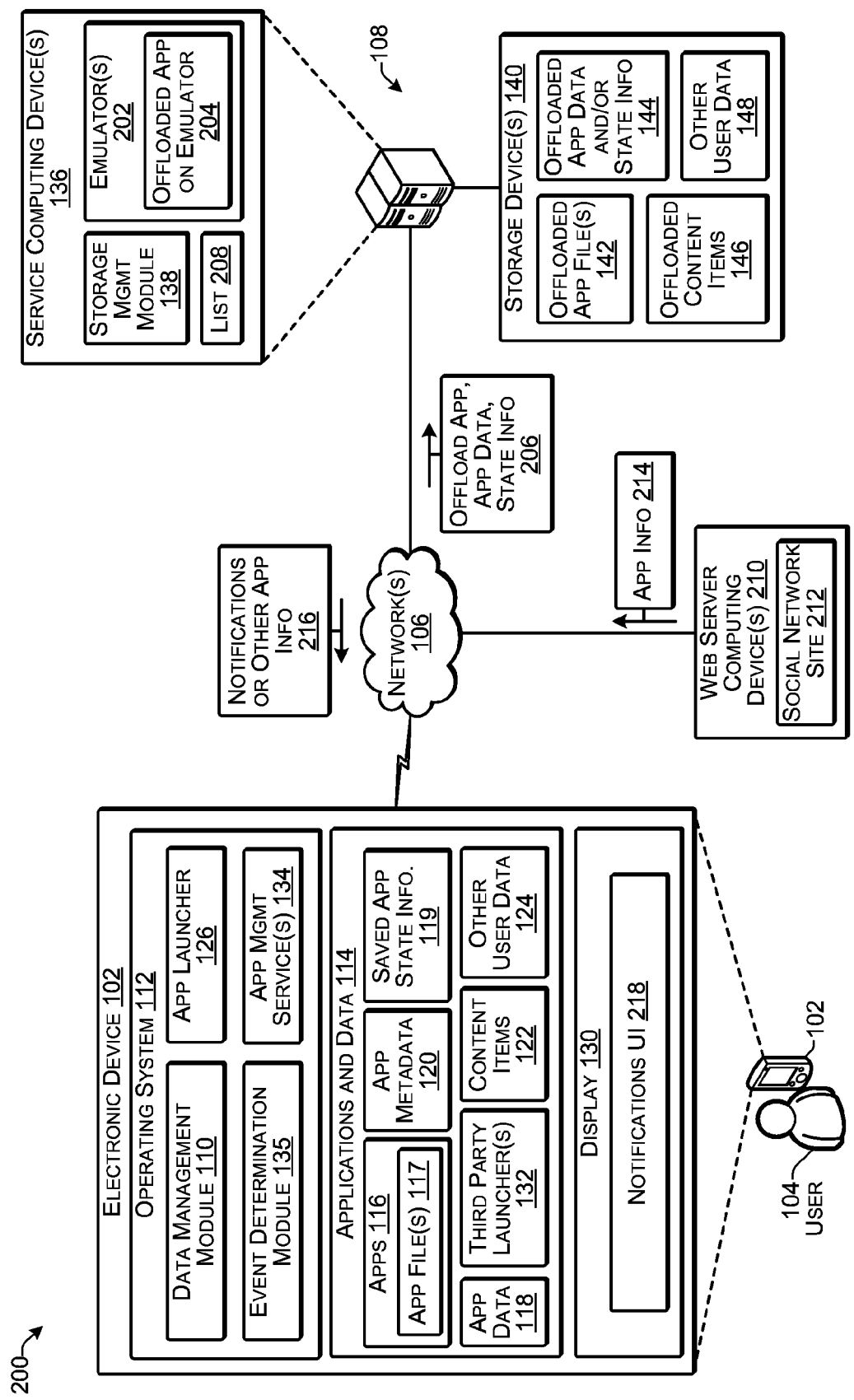
FIG. 2 illustrates an example system for enabling application management on an electronic device according to some implementations.

FIG. 2 illustrates an example system 200 for enabling management of applications according to some implementations. The system 200 may correspond to the system 100 described above with respect to FIG. 1, and may be capable of performing the functions discussed above with respect to FIG. 1. In addition, in this example, the service computing device 136 includes an emulator 202 that may be executed on the service computing device 136 or other suitable computing device. The emulator 202 may be a module that may be executed on the service computing device 136 to emulate an environment of the electronic device 102. For instance, if the electronic device 102 is a mobile electronic device, the emulator may emulate the mobile electronic device environment, such as by emulating the operating system (OS) version and hardware resources of the particular mobile electronic device. Accordingly, the emulator may execute an offloaded application file 204 while the application 204 is offloaded from the electronic device 102, such as for enabling the electronic device 102 to continue to receive notifications or other information from the offloaded application.

In some examples, when certain applications are offloaded from the electronic device 102 the storage management module 138 may determine settings for the emulator 202 at the service computing device 136 that may be used to execute the corresponding offloaded application file 142. For instance, the storage management module 138 may determine the processing capabilities of the electronic device 102, such as by determining a device type of the electronic device 102, a manufacturer or brand of the electronic device, a model of the electronic device, a processor of the electronic device (e.g., processor type or processing capability), a memory size of the electronic device, an operating system of the electronic device, and/or other types of device information, device resources, and the like. Based on this determination, the storage management module 130 may determine that a suitable emulator 202 is available for executing the offloaded application 142.

As one example, suppose that a social network application has been offloaded from the electronic device 102 to the network storage 108, as indicated at 206. For example, the data management module 110 may send the corresponding application file 117, application data 118, and the saved application state information 119 for the offloaded social network application to the network storage 108, and may delete at least some of this information from the electronic device 102 to free up storage space. Further, the storage management module 138 may maintain a list 208 of applications that are to be executed on the emulator 202 when offloaded from the electronic device 102. The applications on the list 208 may include applications that might generate notifications or other information to the user 104 on periodic or other occasional basis. For example, suppose that the social network application generates notifications to the user whenever a friend or other social connection sends a message to the user 104.

The use of the emulator 202 enables the user 104 to continue to receive notifications or other application information, despite the corresponding application being offloaded. For example, when the application is offloaded from the electronic device 102, the storage management module may compare an identifier associated with the offloaded application with the list 208. For example, the identifier may be a name of the application, a version of the application, a type of the application, a source of the application, or the like. In response to determining that the offloaded application is on the list 208, the storage management module may install the received application file 142 on the emulator 204, and may use the application data and saved state information 144 to restore the application to the most recent state. The application may then communicate with a web server 210, such as a web server 210 hosting a social network site 212 corresponding to the application 204 executing on the emulator 202.

As one example, the social network site 212 may send application information 214 to the offloaded application 204, such as a message received from a friend of the user 104. The application 204, in response to receiving this information may generate a notification. An API or other functionality of the storage management module 138 may obtain this notification from the emulator 202, and may send the notification or other application information to the data management module 110, as indicated at 216. The data management module 110 may employ an application management service 134, such as an API on the electronic device 102 to cause the received notification or other application information to be presented with other notifications in a notifications UI 218 presented by the OS 112 of the electronic device on the display 130. As discussed below with respect to FIG. 5, the user 104 may be able to select the notification in the notifications UI 218, which, in some cases may result in the offloaded application 204 being onloaded onto the electronic device 102. In other examples, the data management module 110 may begin onloading the application in response to receiving the notification.

Figure 3:
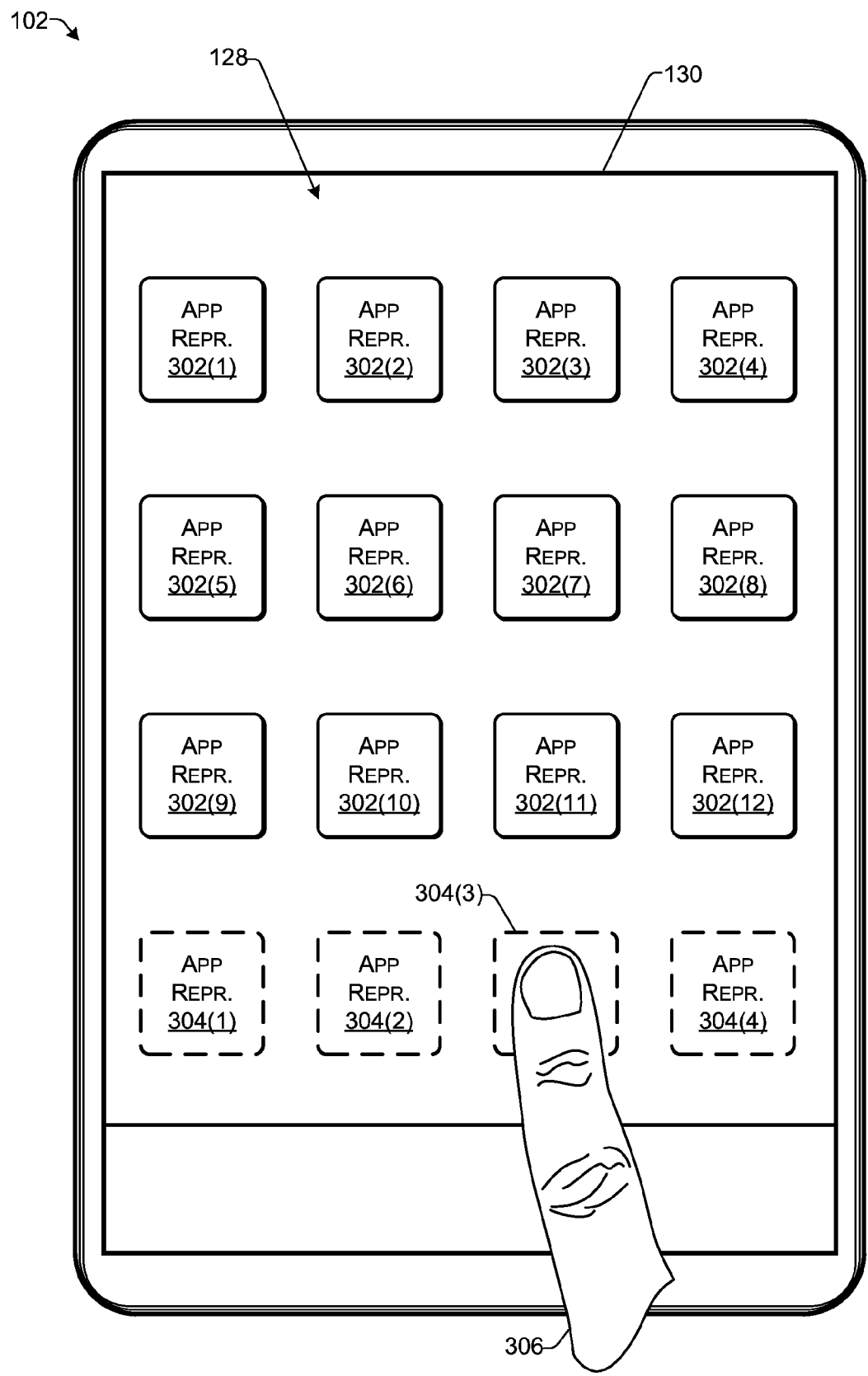
FIG. 3 illustrates an example user interface (UI) for managing applications according to some implementations.

FIG. 3 illustrates an enlarged example view of the electronic device 102 with an example launcher UI 128 presented on the display 130 according to some implementations. The launcher UI 128 may be presented to enable the user 104 to launch, execute, or otherwise select a particular application of a plurality of applications. The launcher UI 128 is an example of a UI that may be presented by either the launcher 126 or the third party launcher 132 according to some implementations. Further, as numerous different configurations are available for launcher UI's, implementations herein are not limited to the example shown in FIG. 3.

In the illustrated example, the launcher UI 128 presents a first plurality of application icons or other representations (repr.) 302 that may represent applications 116 from FIG. 1 that are currently installed on the electronic device 102, such as representations 302(1)-302(12), which may represent twelve respective applications that are installed on the electronic device 102. Furthermore, the launcher UI 128 presents a second plurality of application representations (repr.) 304 that may represent applications that have been offloaded to the network storage 108. In this example, there are four application representations 304(1)-304(4) that represent four applications for which the corresponding application files 142 have been offloaded to the network storage 108. Further, while a single screen of application representations is shown in this example, the user may be able to scroll left-right and/or up-down to view additional representations 302 and/or 304.

In some cases, following offloading of a particular application to the network storage, the representation 304 representing the offloaded application may remain visible in the launcher UI 128 to enable the user to select the offloaded application for execution should the user so desire. As one example, the application representation 304 may be changed in graphical style to indicate that the application has been offloaded to the network storage, such as by placing a cloud symbol on the representation, graying out the representation, showing the representation with dashed or broken lines, showing the representation as larger or smaller than the representations 302, a different shape, or the like. In the illustrated example, the representations 304(1)-304(4) are presented with dashed lines to indicate to the user that the corresponding applications have been offloaded. If one of the corresponding applications were to be onloaded, e.g., application representation 304(3), then following onloading, that representation would subsequently be presented in the graphical style of the representations 302, i.e., with a solid outline instead of a dashed outline. In other examples, the representations 304 representing the offloaded applications may be moved to a different location in the launcher UI 128, such as to a folder for applications that have been offloaded from the electronic device 102, or to a different page, different directory, or the like. Alternatively, as another example, the application representations 304 might not be graphically distinguished from the application representations 302 so that it is not readily apparent to the user that a particular application has been offloaded to the network storage. As still another alternative, rather than being distinguished by graphical style, or in addition to, the representations 304 may be grouped together separately from the representations 302, such as by being located in separate region of the same page, as illustrated in FIG. 3.

In the case that the display 130 is a touchscreen, the user may be able to use a finger 306 to scroll the launcher UI 128 to view other application representations 302 and/or 304. Additionally, the launcher UI 128 may include content item icons, system controls, folders, OS elements, and the like (not shown in FIG. 3). Further, the user may use the finger 306 to tap on or otherwise select a particular application representation 302 or 304 to launch execution of the corresponding application. Thus, in the illustrated example, suppose that the user has selected application representation 304(3), which corresponds to a particular offloaded application. In response, the offloaded application file for the particular offloaded application may be downloaded from the network storage, reinstalled on the electronic device 102, and executed on the electronic device 102 using saved state information to restore the application to its most recent state, as discussed above.

In addition, if the user selects a representation 302 of an application that is currently fully installed on the electronic device 102, the data management module may record the time and date at which the user opens the application, how long the user uses the application, whether the application continues to run while the user uses a second application, which applications the user uses before, during, and after the application, and so forth. The data management module may also record similar information when the user selects a representation of an offloaded application that is not currently executable on the electronic device.

Further, in response to the selection of the offloaded application, the launcher may communicate with the data management module to cause the data management module to onload and install the selected application as quickly as possible. In response, the data management module may download the application and the associated application data, including previously save state information for the application. Further, the launcher may provide the user with periodically updated status information as the downloading and other onloading of the selected application progresses. As one example, rather than removing all traces of an application during uninstalling and/or otherwise offloading of the application, the data management module may maintain metadata for each application whether the application is currently installed or offloaded. As one example, when an application is offloaded, metadata of the application may be left on the electronic device so that the OS launcher and third party launchers on the electronic device are able to determine that an offloaded application exists and is available to be restored onto the electronic device if selected by the user.

Additionally, in some examples, the application data associated with the application and/or saved application state information for the application may also be retained on the electronic device when the application is offloaded. Thus, the data management module might not completely uninstall and remove all traces of an application from the electronic device when offloading an application. Rather, the data management module may leave on the electronic device one or more of application data, saved application state information, or metadata including the application icon or other representation of the application, and may further leave or generate other metadata associated with the application, such as an application file name, application version, application size, size of the associated application data, and so forth. This enables the launcher or a third party launcher to be made aware of the offloaded application, present an icon or other representation of the offloaded application in the launcher UI, and enable selection of the offloaded application by a user, even though the application has been offloaded from the electronic device.

As one example, an application management service, such as a package service may typically be used by the launcher and/or a third party launcher for retrieving information related to the application packages that are currently installed on the electronic device. Thus, when an application has been offloaded, the data management module may place the application into a limbo state such that rather than enabling opening of the application through the launcher or third party launcher, the application management service may provide the launcher or third party launcher with at least a portion of the metadata for the offloaded application. For example, when the data management module offloads the application, the data management module may generate a grayed-out icon, dashed icon, or other graphically distinct representation for the application and store this application representation with the application metadata as the representation to be used by the launcher, or at least the third party launcher. Thus, the application management service may provide the dashed icon to the launcher and/or the third party launcher in place of the actual application representation so long as the application is offloaded from the electronic device. For instance, the third party launcher may present the dashed icon as the application representation without being aware that the application has been offloaded from the electronic device.

When, the user selects the dash lined application representation 303(3), the launcher or the third party launcher, respectively, sends an instruction to or through an application management service, such as to an activity manager service provided by the application management service. In some examples, the launcher or the third party launcher may use an application programming interface (API) that configures the instruction in a uniform manner, regardless of the source, to be delivered to the application management service. In response to receiving the instruction, the application management service may then communicate with the data management module to cause the data management module to begin onloading the application. The data management module may onload the requested application and then may notify the application management service. The application management service may then issue an open call to the application, as if the application had been fully installed onboard the electronic device when the instruction was received from the launcher or the third party launcher. For instance, when a launcher (or other service) is used to launch an application that is currently installed on the electronic device, the launcher may send an open call or similar instruction to the application management service, which opens the selected application.

The launcher is configured to communicate with the data management module, such as via the application management service, to cause the data management module to onload and restore an application. The launcher receives communications from the data management module as the application is restored, such as to enable the launcher to inform the user of the status of the application restoration. For instance, the launcher may present a UI informing the user of an estimated time until the onload and/or installation of the application is complete.

The launcher 126 of FIG. 1, as an OS module or native application, may itself be able to track which applications are currently installed on the electronic device 102 and which applications have been offloaded from the electronic device 102. Thus, in some examples, rather than relying on the data management module to generate a visually distinguished representation, the launcher may present representations of the offloaded applications in a different graphical style from the representations of the applications that are currently installed on the electronic device. For instance, the representations of the offloaded applications may be visually distinguished from the representations of the applications that are currently installed using any of the graphics techniques discussed above or any other suitable visual techniques for distinguishing between the two types of applications.

In addition, implementations herein may be configured to work with third party launchers that users may install on the electronic device. For example, as discussed above, rather than using a native application launcher that comes with the OS, users may install custom third party launchers having various features preferred by certain users. In some cases, the third party launchers may not be aware that an application has been offloaded, such as in the event that all traces of the application are removed from the electronic device during uninstalling and/or otherwise offloading of the application. This may frustrate a user attempting to use the third party launcher to locate and launch an application that has been offloaded. Accordingly, implementations herein enable the third party launchers to present application representations or other information about offloaded applications in addition to presenting representations of applications that are currently fully installed on the electronic device.

Figure 4:
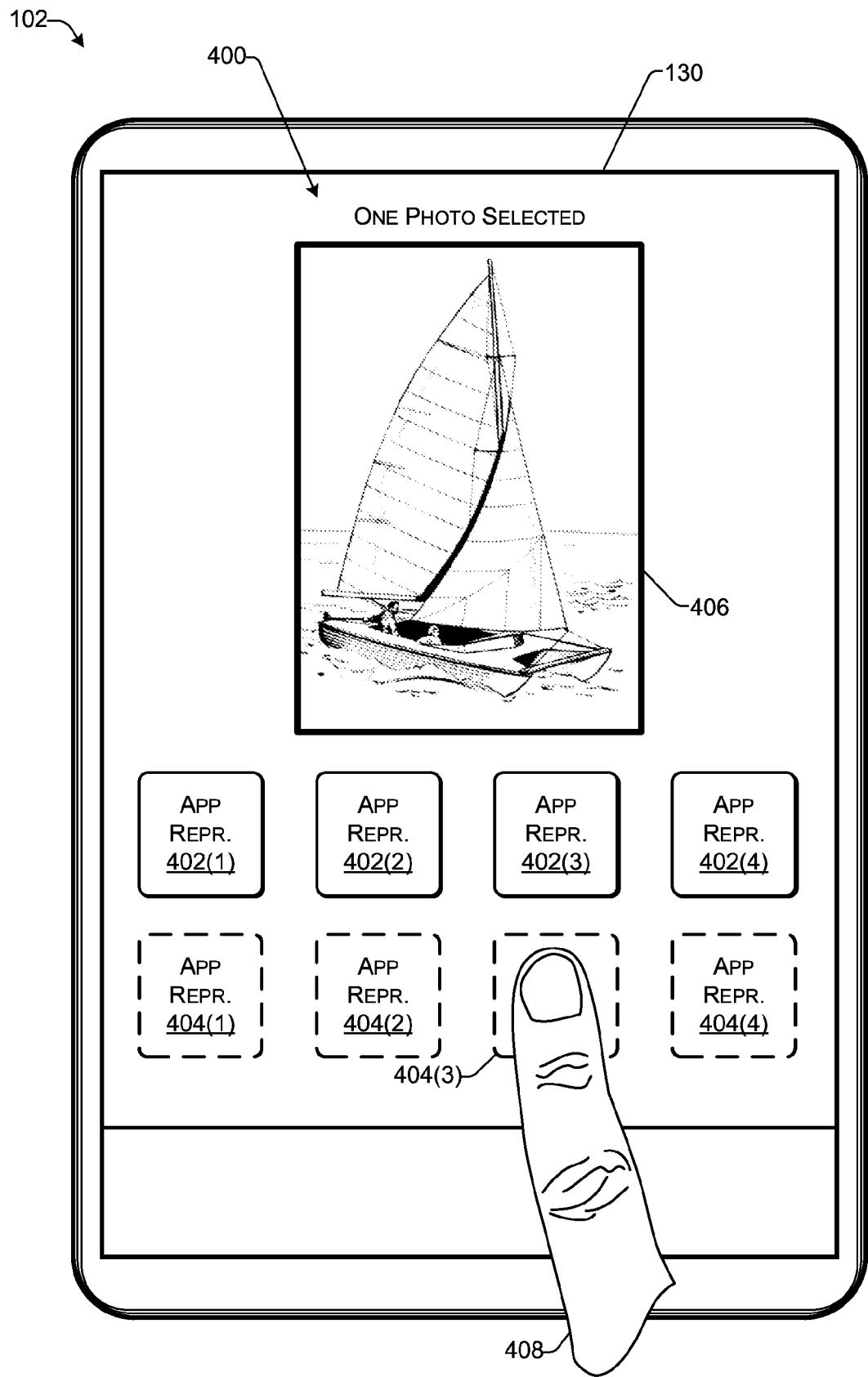
FIG. 4 illustrates an example UI for managing applications according to some implementations.

FIG. 4 illustrates an enlarged example view of the electronic device 102 with an example launcher UI 400 presented on the display 130 according to some implementations. The launcher UI 400 may correspond at least in part to the launcher UI 128 discussed above, and may be presented to enable the user 104 to launch, execute, or otherwise select a particular application of a plurality of applications. The launcher UI 400 is an example of a UI that may be presented by the application launcher 126, the third party application launcher 132, an application 116, or an OS module, as discussed additionally below with respect to FIG. 6. Further, as numerous different configurations are available for launcher UI's, implementations herein are not limited to the example shown in FIG. 4.

In the illustrated example, the launcher UI 400 presents a first plurality of application icons or other application representations (repr.) 402 that may represent applications 116 from FIG. 1 that are currently fully installed on the electronic device 102, such as representations 402(1)-402(4), which may represent four respective applications that are installed on the electronic device 102. Furthermore, the launcher UI 400 presents a second plurality of application representations 404 that may represent applications that have been offloaded to the network storage 108. In this example, there are four application representations 404(1)-404(4) that represent four applications for which the corresponding application files have been offloaded to the network storage 108.

In this example, following offloading of a particular application to the network storage, the representations 404 representing the offloaded applications may remain visible in the launcher UI 400 to enable the user to select the offloaded application for execution should the user so desire. As one example, the application representation 404 may be changed in graphical style to indicate that the application has been moved to the network storage, such as by placing a cloud symbol on the representation, graying out the representation, showing the representation with dashed or broken lines, showing the representation as larger or smaller than the representations 402, a different shape, or the like. In the illustrated example, the representations 404(1)-404(4) are presented with dashed lines to indicate to the user that the corresponding applications have been offloaded. In other examples, the application representations 404 might not be graphically distinguished from the application representations 402 so that it is not readily apparent to the user that a particular application has been offloaded to the network storage.

In the example of FIG. 4, suppose that the user has selected a content item 406, such as a photograph, and the selection of the content item 406 causes the launcher UI to present a plurality of application icons 402 and 404 corresponding to applications that may be used to open the selected content item 406, share the selected content item 406, and/or perform other functions with respect to the selected content item 406. In the case that the display 130 is a touchscreen, the user may be able to use a finger 408 to scroll the launcher UI 400 to view other application representations 402 and/or 404. Additionally, the launcher UI 400 may include content item icons, system controls, folders, OS elements, and the like (not shown in FIG. 4). Further, the user may use the finger 408 to tap on or otherwise select a particular application representation 402 or 404 to launch execution of the corresponding application. Thus, in the illustrated example, suppose that the user has selected application representation 404(3), which corresponds to a particular offloaded application. In response, the particular offloaded application may be downloaded from the network storage, reinstalled on the electronic device, and executed on the electronic device 102 using saved state information to restore the application to its most recent state, as discussed above. The restored application may then be used to perform desired function with respect to the content item.

Figure 5:
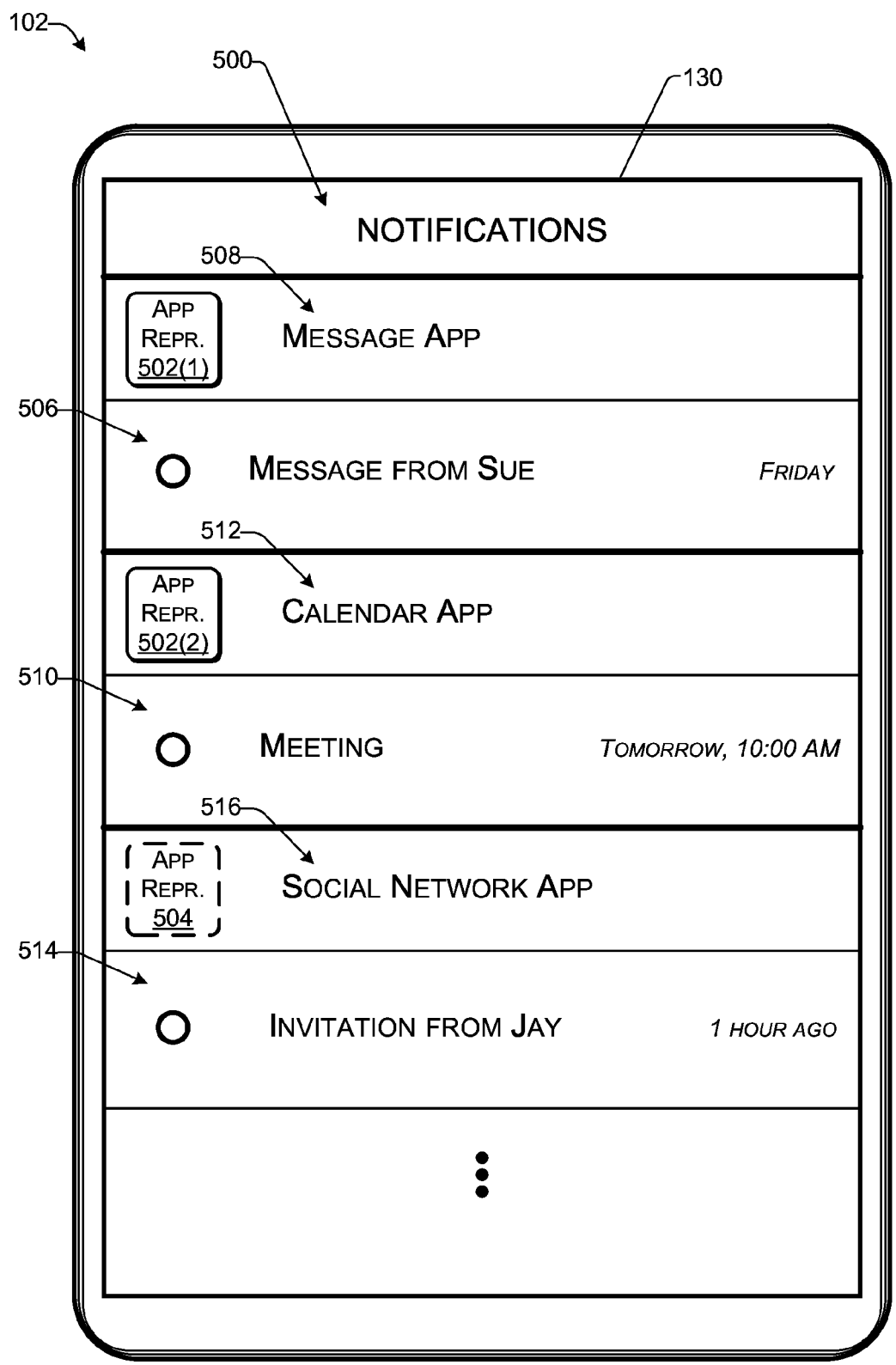
FIG. 5 illustrates an example UI for presenting notifications and managing applications according to some implementations.

FIG. 5 illustrates an example of a UI 500 according to some implementations. The UI 500 may correspond at least in part to the notifications UI 218 discussed above with respect to FIG. 2, and may be presented to enable the user to view incoming notifications, and if desired, to launch, execute, or otherwise select a particular application associated with a particular notification. The UI 500 is an example of a notification and launcher UI that may typically be presented by an OS module, as discussed additionally below with respect to FIG. 6, but which may be launched by an application in some examples. Further, as numerous different configurations are available for notification and launcher UI's, implementations herein are not limited to the example shown in FIG. 5.

In the illustrated example, the UI 500 presents a first plurality of application icons or other application representations (repr.) 502(1) and 502(2) that may represent applications 116 from FIG. 1 that are currently fully installed on the electronic device 102. Furthermore, the launcher UI 500 presents another application representation 504 that may represent an application that has been offloaded to the network storage 108, such as the social network application 204 executed on the emulator 202 discussed above in the example of FIG. 2.

In this example, following offloading of the application to the network storage, the representation 504 representing the offloaded application may be presented in the UI 500 to enable the user to select the offloaded application for execution should the user so desire. As one example, the application representation 504 may be changed in graphical style to indicate that the application has been moved to the network storage, such as by placing a cloud symbol on the representation, graying out the representation, showing the representation with dashed or broken lines, showing the representation as larger or smaller than the representations 502, a different shape, or the like. In the illustrated example, the representation 504 is presented with dashed lines to indicate to the user that the corresponding application has been offloaded. In other examples, the application representation 504 might not be graphically distinguished from the application representations 502 so that it is not readily apparent to the user that a particular application has been offloaded to the network storage.

In the example of FIG. 5, a first notification 506, i.e., a message from Sue, is associated with a message application 508 that is associated with the first application representation 502(1). Furthermore, a second notification 510, i.e., a meeting reminder, is associated with a calendar application 512 that is associated with the second application representation 502(2). In addition, a third notification 514, i.e., an invitation from Jay is associated with a social network application 516 that is associated with the dashed line application representation 504. Accordingly, the UI 500 is able to present notifications or other application information received from an offloaded application that is executed by an emulator at the network storage. In some examples, the user may be able to select the notification 514 and view the notification without onloading the offloaded application. Further, if the user were to select the application icon 504, in some examples this selection may result in the data management module onloading the social network application 516 onto the electronic device 102. Alternatively, in other examples, when the electronic device 102 receives the notification 514, the data management module may automatically start onloading the corresponding social network application 516.

In some implementations, one or more additional UIs (not shown in FIG. 5) may enable the user to interact with the electronic device 102 for additional application management on the electronic device 102. For instance, the user may have an opportunity to select particular applications to be offloaded from the electronic device 102. As one example, a GUI may present a plurality of applications recommended for offloading in a ranked order, such as based on infrequency of use, amount of storage space consumed, or other criteria, as enumerated above. For instance, a least frequently used (or least recently used) application may be listed first, a next least frequently used application may be listed second, and so forth. Further, in some examples, the applications recommended or selected for offloading may consume an amount of storage space in excess of a threshold amount so that it is worth the overhead costs to offload and onload the application.

In other examples, rather than presenting recommended applications for user selection and/or approval, the data management module may proceed with offloading recommended applications according the ranked order. As still another example, the data management module may automatically and dynamically offload an application when a threshold minimum level of remaining free storage space is reached. For example, suppose that the user is using the electronic device to take photographs or video. Further, suppose that the electronic device 102 determines that that the user is close to running out of storage space on the electronic device 102, e.g., has arrived at a threshold amount of remaining storage capacity. If the electronic device 102 is able to communicate with the network storage, the electronic device 102 may proceed with offloading one or more applications, such as by a background process, based on the ranking criteria discussed above or other suitable criteria.

Further, in some examples, the user may be able specify how long applications are to be retained at the remote storage before being permanently deleted. For example, if the application has been at the network storage for a year (or other specified time) after offloading, and has not been used by the user during that time, the storage management module or the data management module may inform the user that the application will be permanently deleted and/or may proceed with permanently deleting the application and associated application data from the network storage and deleting the corresponding application metadata from the electronic device 102.

Figure 6:
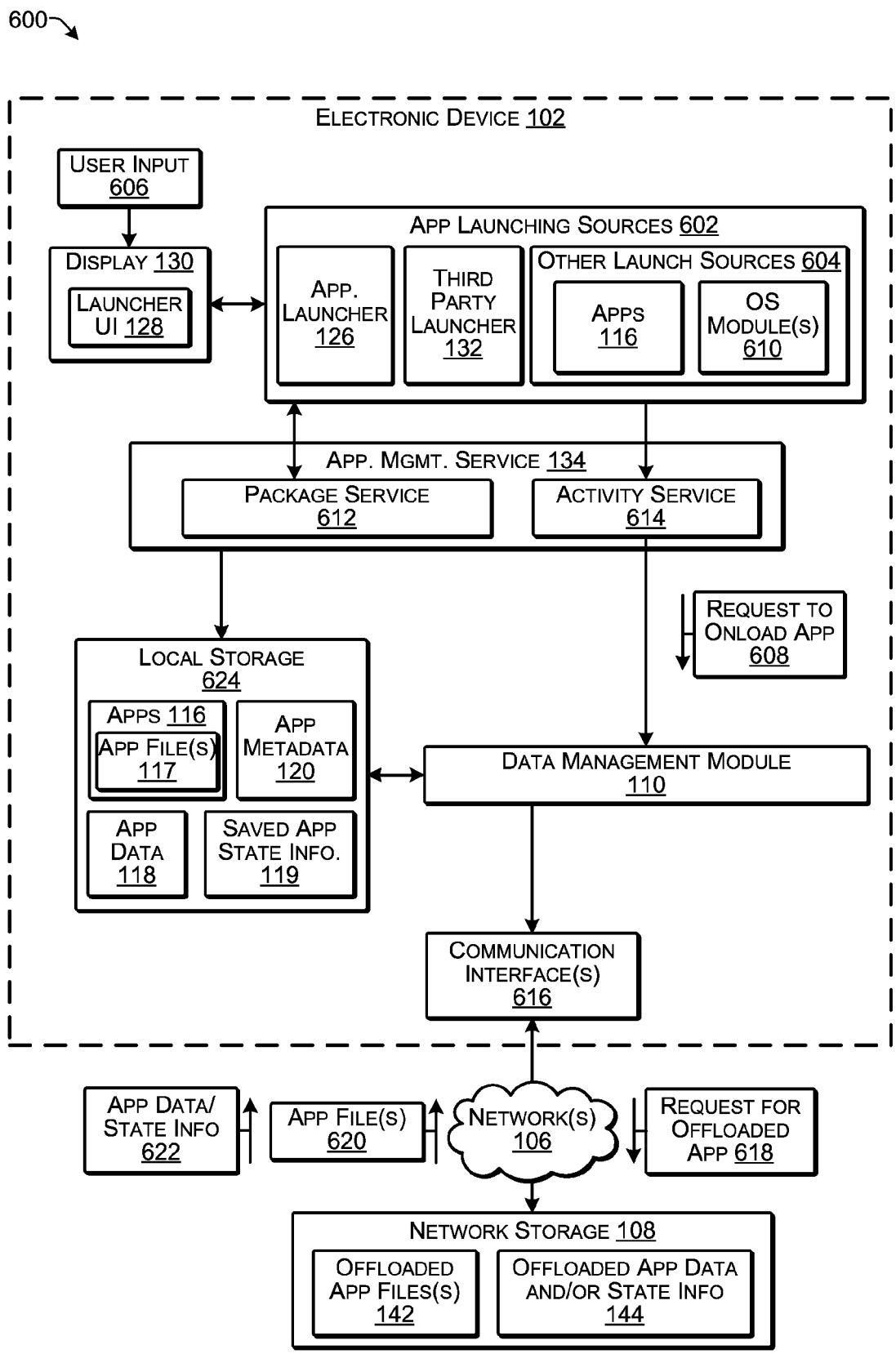
FIG. 6 is a block diagram illustrating interaction of components of an example electronic device for launching an application according to some implementations.

FIG. 6 is an example block diagram 600 illustrating interaction of components of the electronic device 102 according to some implementations. In this example, a plurality of application launching sources 602 include the application launcher 126, the third party launcher 132, applications 116 and other launch sources 604. For instance, as discussed above, the application launcher 126 and the third party launcher 132 may present a launcher UI 128 on the display 130. The display 130 may be a touchscreen display able to receive a user input 606 to the launcher UI 128. In other examples, other types of input devices may be used to provide the user input 606 via the launcher UI 128.

In addition, other launch sources 604 may include a variety of other techniques and circumstances under which an application may be launched on the electronic device 102. Thus, the other launch sources 604 may also present a launcher UI 128, 400, or 500 that enables the user to select an application for execution by making an input via the UI. As one example, one or more of the applications 116 may also serve as a launch source 602. For example, a first application 116 may be configured to launch a second application, such as based on user inputs 606, or the like. As one example, the second application may be a map application opened by user input 606 to the first application, such as to show the user a location on a map. If the second application is an offloaded application, then the data management module 110 may receive a request 608 to onload the second application based on the launch initiated via the first application 116.

Additional techniques for launching an application on the electronic device 102 without using a designated launcher application may include a sharing action performed by the user, such as when presented with a "share" button or other virtual control in a UI, such as the UI 400 discussed above with respect to FIG. 4, which may be provided by an application 116 or an OS module 610. For example, the user may be presented with a list of options to use the share button to share an image, such as through email, a social network, a microblog, a pinning site, a photo sharing site, or various other applications. The user may select the share button associated with the image, which may cause a list of applications that may be used to share the image to be presented to the user. Some of the listed applications may have been offloaded, but implementations herein may still include the offloaded applications in the list. For instance, based on the retained application metadata 120 discussed above, the application management service 134 may be used to assemble a list of applications available on the electronic device, which may include the immediately executable applications 116 and the offloaded applications. As one example, the application management service 134 may include a package service 612 that identifies application packages present on the electronic device 102. For example, the package service 612 may be configured to identify applications on the electronic device 102 based on the metadata 120 in addition to other conventional techniques for identifying applications installed on the electronic device 102. Accordingly, the application launching sources 602, including the application launcher 126, the third party launcher 132, and the other launch sources 604 may use the package service 612 for determining available applications even though some of those applications may have been offloaded from the electronic device. As one example, the app launching sources 602 may employ the package service 612 based on an API for determining the applications on the device.

Further, implementations herein are not limited to using the application management service 134 for determining applications that are installed on the electronic device 102 and applications that have been offloaded. For example, the application launcher 126 may be configured to receive this information directly from the data management module 110 or another OS module.

As another example of the other launch sources 604, when selecting a content item, such as a text document, the user may be presented with a list of applications able to open the text document. Thus, similar to the share button example above, some of the applications in the list may be applications that have been offloaded, as also discussed above with respect to the UI 400 of FIG. 4. Further, another example of a method for opening an application may be a notification presented by the electronic device, such as by an OS module 610, in a notification UI, as discussed above with respect to FIG. 5. As one example, when the user selects the notification or an associated application representation, the selection may cause an application associated with the notification to launch. An example of this may be a social network application, an email application, or microblog application that launches in response to user selection of a notification. Similarly, a settings interface provided by the OS may also cause an application to launch in some situations, such as when the user is adjusting settings that affect a particular application.

Selection by the user of one of the offloaded applications through the application launching sources 602 may cause the application management service 134 to send the request 608 to the data management module 110 to cause the data management module 110 to immediately begin downloading an offloaded application file 142 corresponding to the selected offloaded application. In response to receiving a selection of an application, either one fully installed on the electronic device, or one that has been offloaded, the launcher 126, the third party launcher 132 and/or the other launch sources 604 may communication with an activity service 614, such as through an API, to cause the selected application to launch or otherwise execute on the electronic device 102. For instance, the launching source 602 sends an instruction via an activity service 614 API to begin execution of the selected application. If the application is already loaded on the electronic device, the activity service 614 may be performed in a conventional manner.

On the other hand, if the selected application has been offloaded, the activity service 614 may determine that the selected application is not currently executable on the electronic device 102. Thus, the activity service 614 may send the request 608 to the data management module 110 to cause the data management module 110 to onload the corresponding application file. Further, in some cases, the data management module 110 may also request offloaded application data and offloaded application state information for the selected application. In some examples, the launchers 126 and 132 and the other launch sources 604 that launch applications may use a public API to communicate with the activity service 614, which interprets the intent of the communication. For instance, if a first application 116 provides a business address, the intent may be interpreted by the activity service 614 as opening a map showing the address on the map. Further, suppose that there are three applications available for opening a map, one of which is currently installed on the electronic device, and two others that have been offloaded. Accordingly, an intent API may be used for determining a particular application to open. Therefore, the activity service 614 may generate an instruction based on the determined intent. If the activity service 614 determines that the intent is to open one of the offloaded applications, the activity service 614 sends the request 608 to the data management module 110, which in turn sends, via one or more communication interfaces 616, a request 618 for the particular offloaded application file 142 and, in some examples, the associated application data and/or saved application state information 144.

In response to receiving the request 618 from the data management module 110, the network storage 108 may send the requested application file 142, as indicated at 620. Further, in some examples, the network storage may send application data and/or saved application state information to the electronic device 102, as indicated at 622. The data management module 110 may receive the application file, and in some cases, the application data, and the application state information, via the communication interfaces 616, and may store the received data in a local storage 624.

In some implementations, following receipt of the application file, the data management module 110 may proceed with installing the application. For example, the data management module 110 may install the application, restore the application data, and restore the application to its most recent state based on the saved application state information. The data management module 110 may then send a message to the activity service indicating that the application has been installed. The activity service 614 may then proceed with launching the application in a conventional manner.

In other examples, the application file is not reinstalled. Instead, the application file 117 may be saved to the local storage 624 and associated with the application data 118, the saved application state information 119, and the application metadata 120. As one example, an API that is used for updating application files by replacing an older application file (e.g., an APK file) with a newer application file may be used to onload the application file without executing a reinstallation process.

The application launching sources 602, the activity service 614, and the data management module 110 typically only perform the above operations for onboarding an application out of turn if the data management module 110 has made an incorrect prediction as to which applications 116 should be available on the electronic device 102 during a particular period. Accordingly, in some examples, when the data management module 110 has to onload an application unexpectedly, the data management module 110 may make a record of the launch source, i.e., where the launch instruction came from, and may observe application usage patterns of the user with respect to the onloaded application for adjusting the heuristics used for determining which applications to offload and which applications to onload.

In addition, in some examples, the data management module 110 may determine particular applications that the user may desire to have installed and executable even if the user does not open the particular applications, such as applications that run in the background for performing various functions in certain situations. As one example, a coupon application may run in the background and may generate coupons when the user walks past a particular merchant location. The user does not typically open these types of applications, and in general may not think about opening such an application until the application produces a coupon or other notification to the user. Accordingly, as discussed below with respect to FIG. 7, the event module may predict user activity, such as determining that the user is going shopping, and may restore applications appropriate for the predicted user activity.

The data management module 110 may also continually save backups of applications that have been used, e.g., application data and application state information, so that when an application is to be offloaded, there is no time wasted sending the application file, application data, or saved application state information to the network storage 108. Rather, because all the application information may typically already have been backed up to the network storage in the background, there may be no need to send any addition application data or files. For instance, when a first application is to be onloaded onto the electronic device 102, a second application that is to be offloaded to make room for the first application may be offloaded by either uninstalling the second application from the electronic device, or by merely deleting the second application file without uninstalling, and it may not be necessary to transfer any application information for the second application to the network storage. Alternatively, in other examples, the second application file may be sent to the network storage as part of the offloading, either with or without uninstallation of the second application, and then the second application file may be deleted from the electronic device 102.

Accordingly, since the user data on the electronic device 102 may be regularly backed up or otherwise synchronized with the user data at the network storage, in some examples, offloading a particular application from the electronic device 102 to the network storage 108 may merely include ensuring the latest version of the application file 117, application data 119, and/or saved application state information 119 has already be synchronized with the network storage 108. As mentioned above, various techniques may be used to select an application to offload in the case that the user requests onloading of an application that is not currently installed on the electronic device 102, such as least recently used, least frequently used, largest application not expected to be used within a threshold period, or so forth.

Figure 7:
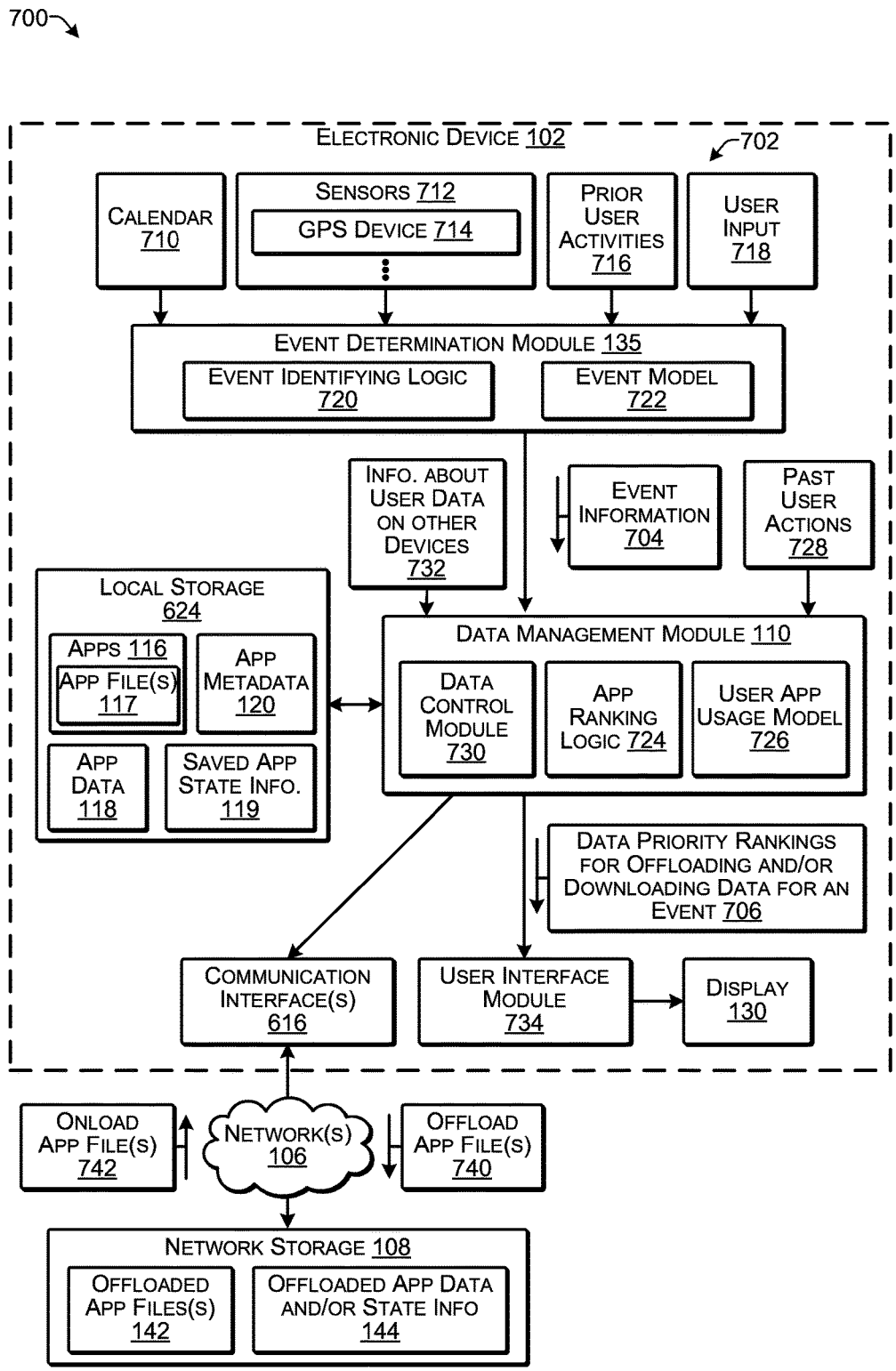
FIG. 7 is a block diagram illustrating interaction of components for determining to onload or offload applications according to some implementations.

FIG. 7 is a block diagram 700 illustrating examples of determining information used for deciding to onload applications onto the electronic device and/or offload applications from the electronic device according to some implementations. In the example of FIG. 7, the event determination module 135 may receive one or more inputs 702 to use for detecting, identifying, or otherwise determining that an event will take place. In response to determining that an event will take place, the event determination module 135 may provide event information 704 to the data management module 110. Based at least in part on the event information 704, the data management module 110 may determine data priority rankings 706 for offloading and/or onloading data for the prospective event.

In some examples, an event may include an activity or other situation during which the user may be predicted to use a particular application. Various types of events may cause the data management module 110 to onload or offload particular applications. One example of such an event may include the user participating in an activity during which substantial amounts of new data will be added to the local storage over a short period of time, such as when the user is using the electronic device to take a large number of pictures or video. Another example of such an event may include the user participating in an activity that may use a certain application that is not normally present on the electronic device, such as when the user has an upcoming flight an in the past the user has used the certain application while on other flights.

The event determination module 135 may receive the various inputs 702 that can be used for determining upcoming events. As one example, the inputs 702 may include calendar information from the user's calendar 710. For instance, the event determination module 135 may periodically access the user's calendar to determine whether any appointments or other scheduled activities may indicate an upcoming event. As one example, if the user has a flight scheduled on the calendar, the event determination module 135 may determine this to be an event, and may forward event information 704 related to the flight to the data management module 110. In some examples, the event information 704 may include an event category for the event. For example, different types of events may be categorized into different event categories that may each be associated with different user application usage patterns. Further, in other examples, the data management module may determine an event category for a particular event, while in still other examples event categories might not be used.

As another example, the event determination module 135 may receive inputs from one or more sensors 712 on the electronic device such as a GPS (Global Positioning System) device 714, or other sensor that may indicate a geographic location of the electronic device 102 or an activity of the user. For instance, if the sensors 712 indicate that the user is currently located in a city 300 miles from the user's home location this may indicate that the user is traveling in the city any may desire to have certain applications onloaded, such as applications for finding restaurants or hotels.

As another example, prior user activities 716 may also indicate the likelihood of an upcoming event. For instance, if the user has worked as a DJ every Saturday night for the past month, then it is likely that the user will also be performing this job on the next Saturday night. Furthermore, the inputs 702 may include a direct user input 718 for indicating an event. For example, the user may expressly schedule events by providing event information 704 directly to the electronic device 102, such as via a UI.

The event determination module 135 may include event identifying logic 720 that may receive the inputs 702 and determine one or more upcoming events based on the inputs 702. In some cases, the event identifying logic 720 may include, or may access, an event model 722 that may be used to identify events based on the inputs 702. As one example, the event model 722 may be a statistical model that is initially trained using a set of training data. For instance, the training data may be obtained by identifying various different types of events for a plurality of users. The trained model may be checked for accuracy and then used for identifying events for a particular user based on the inputs 702. The statistical model may be periodically updated and re-trained based on new training data and/or feedback from the user to keep the event model 722 up to date. Examples of suitable statistical models that may be incorporated into the event model 722 may include regression models, such as linear regression models, and stochastic models, such as Markov models, hidden Markov models, and so forth. Additionally, or alternatively, various other algorithms, priority rules, rule sets, computational models, and the like, may be used by the event identifying logic 720 for determining upcoming events.

The data management module 110 receives the event information 704 from the event determination module 135 and, in response, may determine one or more applications that are likely to be useful to the user for a particular event. For instance, the data management module may include application ranking logic 724 that may prioritize or otherwise rank the applications 116 for determining which applications to move on or off the electronic device 102 for a particular event. In some examples, the application ranking logic 724 may include one or more algorithms, priority rules, rule sets, computational models, user preferences, or the like, configured to select particular applications for onloading to the local storage 624, or for offloading from the local storage 624 to the network storage 108. For instance, the application ranking logic 724 may include a plurality of decision-making rules that may be applied to generate priority based rankings of the applications for onloading or offloading.

In some examples, the application ranking logic 724 may include or may access a user application usage model 726 that may include various other algorithms, priority rules, rule sets, computational models, and the like, that may be used by the event identifying logic to take into account numerous pieces of information related to various activities of the user, events that the user has participated in the past, preferences of the user, and so forth. Furthermore, the user application usage model 726 may include machine learning capability to change the data ranking rules and priorities based on past user actions 728, which may include application usage during various categories of events (e.g., particular apps and content items used for particular event categories), user responses to past onload or offload recommendations from the data management module 110, and other user feedback determined in response to earlier data rankings and recommendations provided by the data management module 110. In some examples, the user application usage model 726 may include a trained statistical model of a type similar to that discussed above for the event model 722, but trained based on the application onload and offload preferences and actions of the user and/or a plurality of other users.

As one example, based at least in part on receiving event information 704 related to an upcoming event, the data management module 110 may use the application ranking logic 724 and user application usage model 726 to generate a first list of applications that are recommended for onloading to the local storage 624, and a second list of applications that are recommended for offloading to the network storage 108. For example, the applications in the second list may be offloaded from the local storage 624 to provide sufficient space in the local storage 624 to enable onloading of the applications in the first list that are recommended by the data management module 110 for a particular event.

The application ranking logic 724 and/or user application usage model 726 may take into consideration a plurality of factors when ranking and determining applications to recommend for onloading and/or offloading for a particular event. For instance, based on the user application usage model 726, priority rules, expressed user preferences, or other application ranking techniques, the application ranking logic 724 may determine which application is likely to be used by the user during the particular event and which application is unlikely to be used during the particular event, and may rank the applications according to these probabilities. In addition, in some examples, the data control module 730 may operate without receiving the event information 704.

As one example, the application ranking logic 724 may rely on the user application usage model 726 for determining particular applications for onloading on particular days of the week, such based on past usage information indicating that the user has used these particular applications on particular days of the week in the past. Further, when ranking applications to offload, the application ranking logic 724 may rank applications for offloading from the electronic device 102 based at least in part on at least one of: an amount of time since the application was last accessed on the electronic device; a frequency with which the application has been accessed over a period of time; an amount of storage space consumed by the application file; or an amount of available storage space remaining on the electronic device.

In some cases, the application ranking logic 724 may take into consideration prior usage of applications by the user during similar events in the past (e.g., events categorized in a same or similar event category). For instance, if the user typically uses certain applications on a flight, during travel in a new city, while on a road trip, or during other particular categories of events, the application ranking logic 724 may recommend that those applications and associated application data be onloaded to the local storage for an event categorized in a similar or same category. As another example, the application ranking logic 724 may take into consideration seasonal factors and various other time-based factors when determining likelihoods that particular applications may be useful to the user during an event.

In addition, the data control module 730 may perform various functions for controlling the movement of applications onto or off the local storage 624. In some examples, the user may configure the data management module 110 to automatically offload the applications in a second ranked list, and automatically onload the applications in the first ranked list. In other examples, the user may retain more control and may individually select or approve particular applications from the first list to be onloaded and/or applications from the second list to be offloaded. For instance, the user can select some or all of the applications in the first list that are recommended to be loaded onto the electronic device 102. In either event, after the application transfers have been completed, the user will be able to access the recommended applications while the electronic device 102 is being used during the event.

The data management module 110 may provide the first list and the second list as the data priority rankings 706 to a user interface module 734. The user interface module 734 may present, on the display 138, the data recommended for onload or offload in one or more UIs. The UIs may provide the user with an opportunity to select content items, applications, or other user data to be onloaded onto the electronic device and/or offloaded from the electronic device. As mentioned above, the UIs may present the applications recommended for onloading and/or offloading in a ranked order, which may be based at least in part on a category of the particular event.

In other examples, rather than presenting recommendations for user approval, the data management module 110 may proceed with onloading and/or offloading the recommended applications according to the ranked order. For instance, the data control module 730 may interact with the one or more communication interfaces 616 to send any offloaded application files 740 to the network storage 108 and/or to receive any onloaded applications files 732 from the network storage 108.

Figure 8:
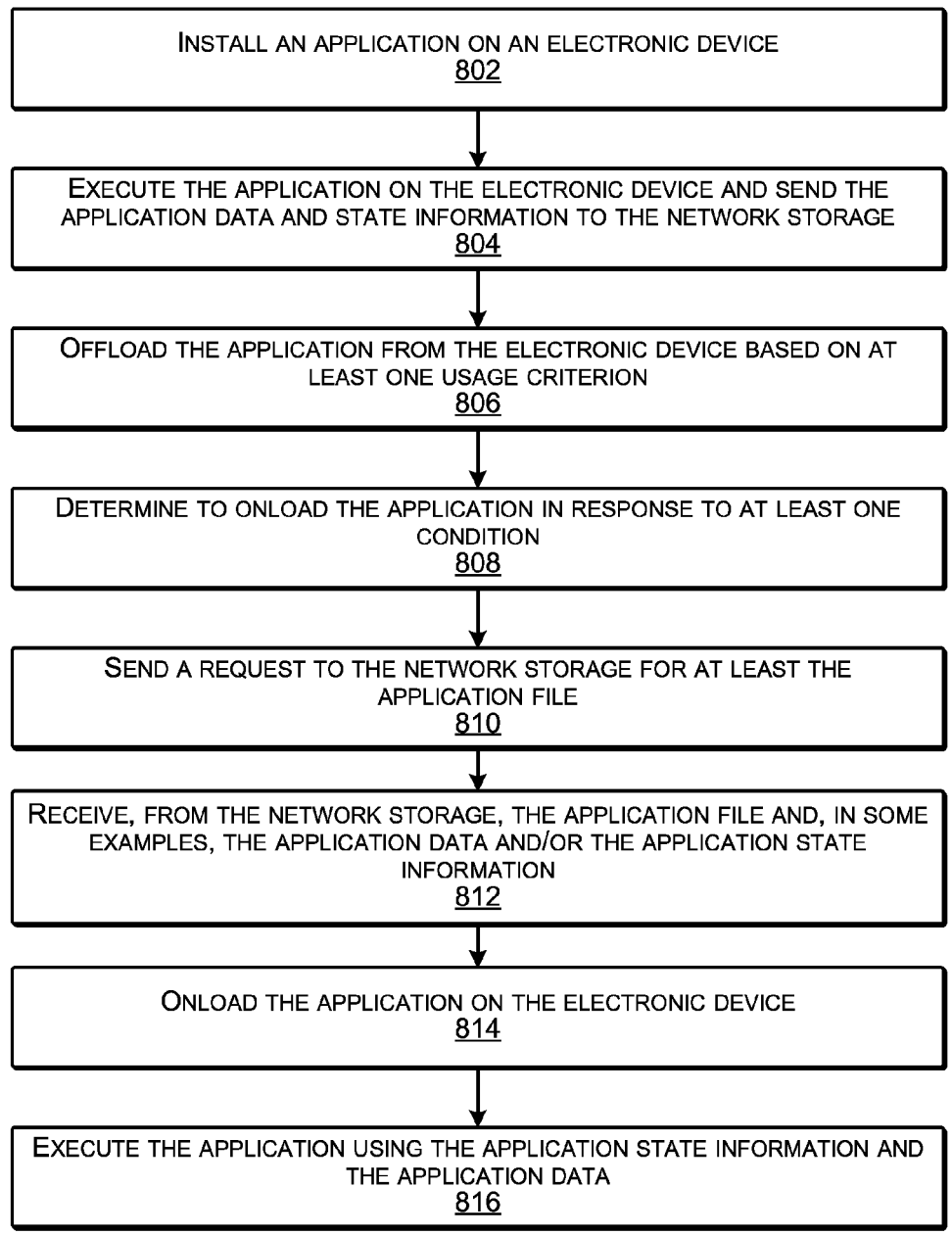
FIG. 8 is a flow diagram illustrating an example process for managing applications on an electronic device according to some implementations.
Figure 9:
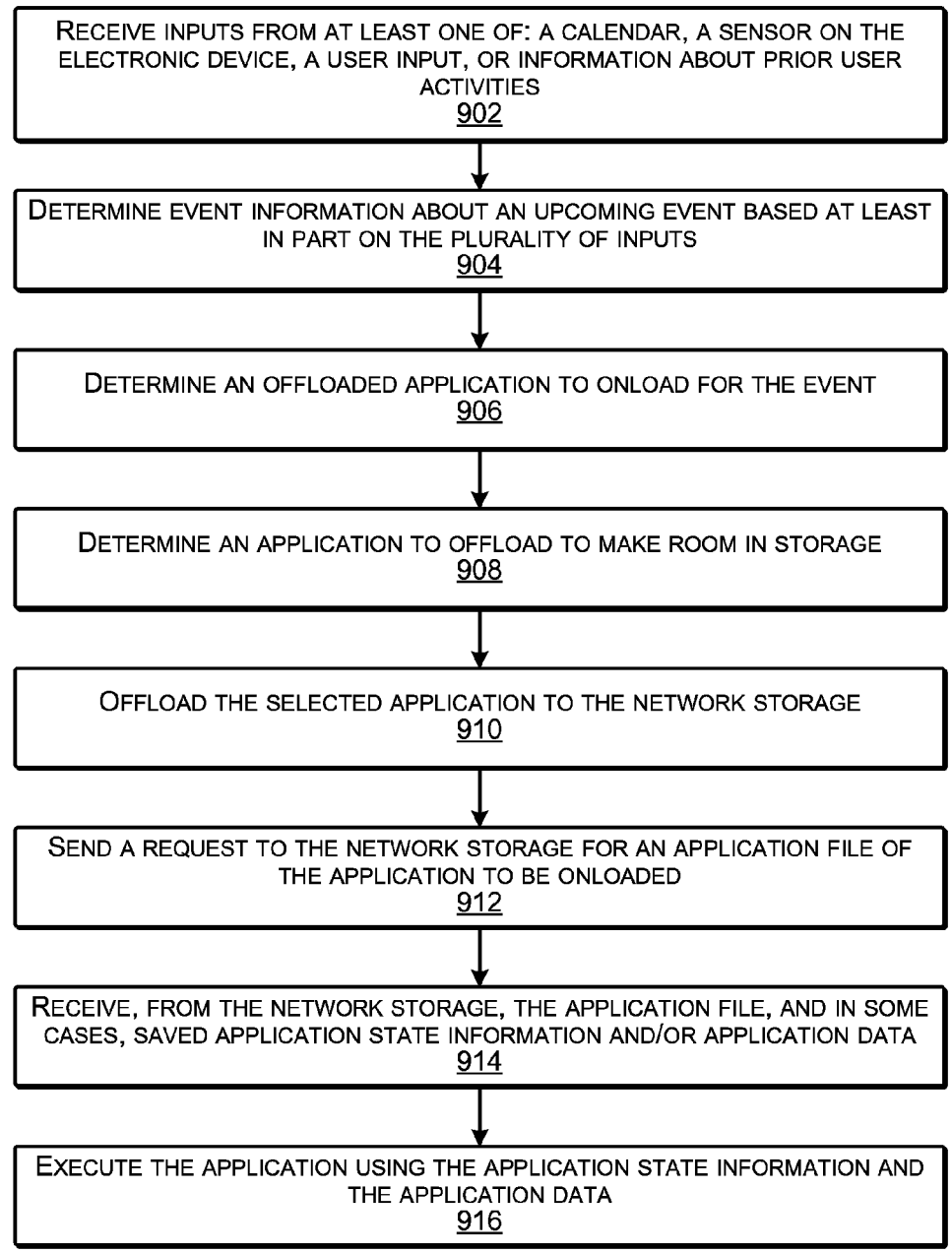
FIG. 9 is a flow diagram illustrating an example process for managing applications on an electronic device according to some implementations.
Figure 10:
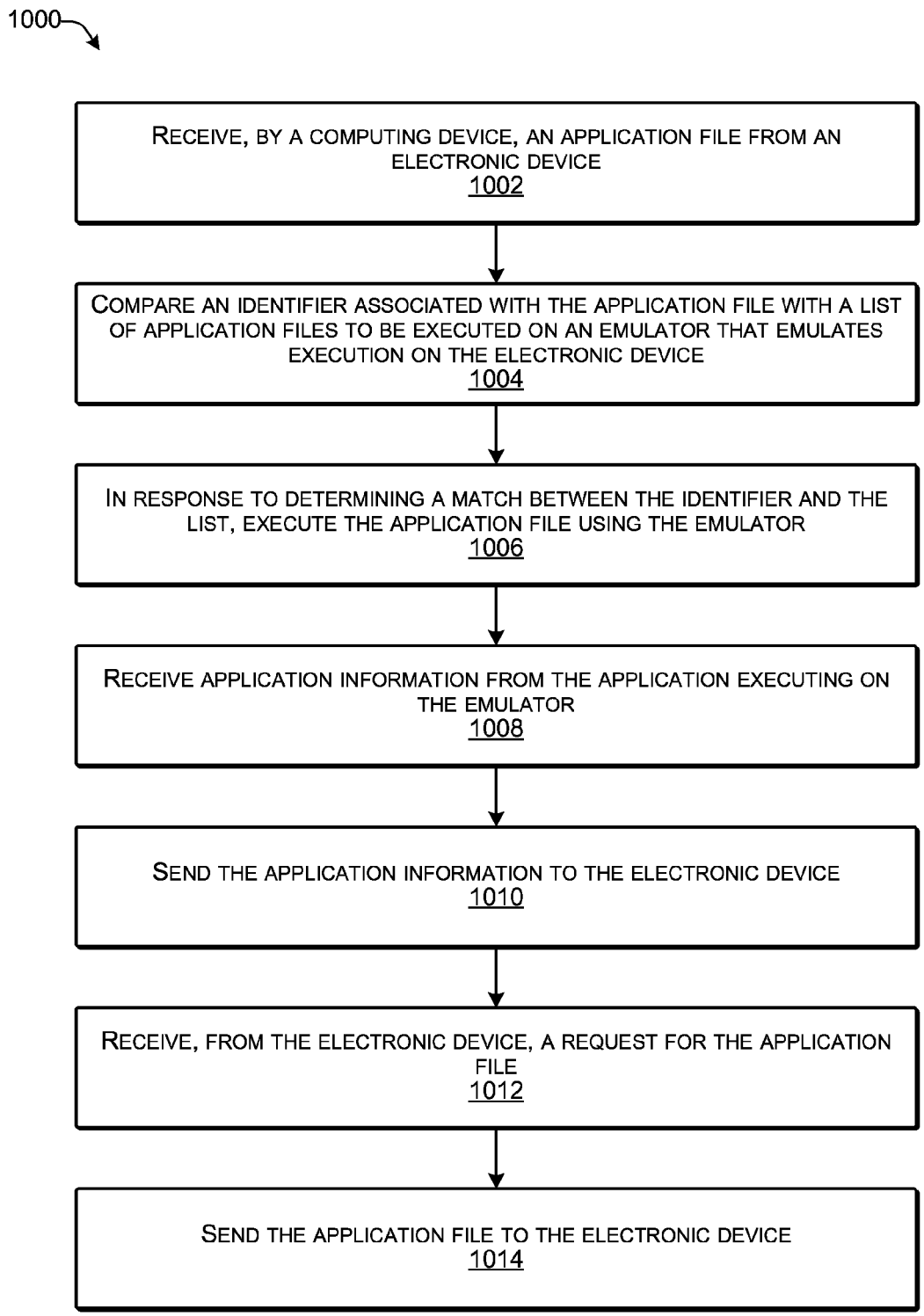
FIG. 10 is a flow diagram illustrating an example process for managing applications at a network storage according to some implementations.

FIGS. 8-10 are flow diagrams illustrating example processes for managing applications according to some implementations. The processes are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems.

FIG. 8 is a flow diagram illustrating an example process 800 for application management according to some implementations. In some examples, the process may be executed by the electronic device 102 or by another suitable computing device.

At 802, the electronic device may install an application on the electronic device. In some examples, the electronic device may send a copy of the installable application file used for installation to a network storage before, during, or after installation of the application on the electronic device. For example, a computing device at the network storage may receive the application file from the electronic device or directly from an application store from which the electronic device obtained the application. Alternatively, as discussed below with respect to block 806, the application file may be sent to the network storage when the application is offloaded from the electronic device.

At 804, the electronic device executes the application on the electronic device. Further, the electronic device may send application data and application state information resulting from the execution of the application to the network storage.

At 806, the electronic device may offload the application from the electronic device. For example, the electronic device may determine to offload the application to the network storage based at least in part on at least one of: an amount of time since the application was last accessed on the electronic device; a frequency with which the application was accessed over a period of time; an amount of storage space consumed by the application; or an amount of available storage space remaining on the electronic device. In some examples, offloading of the application may include uninstalling the application from the electronic device. In such a case, the application file for reinstalling the application may have already been saved to the network storage as discussed above at block 802. The associated application data may have already been backed up and saved at the network storage or may be sent to the network storage during offloading of the application. Further, in some examples, saved application state information may also be saved at the network storage. In other examples of offloading the application, rather than uninstalling the application from the electronic device, the application file (e.g., an APK file) may be removed from the electronic device and saved to the network storage without uninstalling the application or application data. Further, if an OBB file or other asset file is associated with the particular application, this application file may also be saved to the network storage and deleted from the electronic device. Further, in some examples, the application data generated by execution of the application and the saved application state information may remain on the electronic device, while one or more application files (e.g., an APK file and an OBB file in the case of an ANDROID® OS) may be offloaded from the electronic device to the network storage without uninstalling the application from the electronic device.

At 808, the electronic device may determine to onload the application in response to at least one condition. For example, the condition may include at least one of: receipt of a user input that selects an application representation corresponding to the offloaded application; a determination of an upcoming event that is likely to include use of the offloaded application; a determination that a user usage pattern indicates that the offloaded application is likely to be used within a threshold time; or receipt of an application notification from execution of the application file on an emulator.

At 810, the electronic device may end a request to the network storage for at least the application file. In some examples, the electronic device may also request associated application data saved to the network storage and/or saved application state information saved to the network storage. In other examples, the associated application data and/or the saved application state information may have been retained on the electronic device.

At 812, the electronic device may receive, from the from the network storage, the application file that was saved to the network storage either in connection with installation of the application on the electronic device, as discussed above with respect to block 802, or that was saved during offloading of the application as discussed with respect to block 806. In some examples, multiple application files may be received, such as an installable application file (e.g., an APK file) and an application asset file (e.g., an OBB file). In some examples, the electronic device may further receive the associated application data and/or saved application state information from the network storage. In other examples, however, the associated application data and/or saved application state information may have been retained on the electronic device when the application was offloaded.

At 814, the electronic device may onload the application on the electronic device. As one example, the electronic device may reinstall the application onto the electronic device. As another example, if the application was not uninstalled during offloading, the received application file(s) may be saved to the storage of the electronic device and restored using the saved application state information and associated application data. In some cases, an API associated with the OS may be used for restoring the application file to the electronic device without reinstalling of the application.

At 818, the electronic device may execute the application using the saved application state information and the application data received from the network storage. For instance, the electronic device may use the saved application state information when starting the application to cause the application to resume execution at a state at which the application last executed on the electronic device.

FIG. 9 is a flow diagram illustrating an example process 900 for application management according to some implementations. In some examples, the process may be executed by the electronic device 102 or by another suitable computing device.

At 902, the electronic device may receive inputs from at least one of: a calendar, a sensor on the electronic device, user input, or information about prior user activities.

At 904, the electronic device may determine event information about an upcoming event based at least in part on the plurality of inputs. For example, the electronic device may determine that the user has an upcoming flight, exercise session, conference or seminar, class, or other event occurring within a threshold period of time, such as within the next hour, next day, or the like, depending on the type of event.

At 906, the electronic device may determine an offloaded application to onload for the event. For example, the electronic device may determine an application used by the user during events in a same event category in the past, and may onload the determined application.

At 908, the electronic device may determine an application to offload to make room in storage. For example, the electronic device may select an application to offload based at least in part on at least one of: an amount of time since the application was last accessed on the electronic device; a frequency with which the application was accessed over a period of time; an amount of storage space consumed by the application; or an amount of available storage space remaining on the electronic device. In some examples, the electronic device may present a ranked list of applications eligible to be offloaded, and allow the user to select one or more particular applications, while in other examples, the electronic device may proceed with offloading based on the rankings in the ranked list without first obtaining user input.

At 910, electronic device may offload the selected application to the network storage. In some examples, offloading of the application may include uninstalling the application from the electronic device. In such a case, the application file for reinstalling the application may have already been saved to the network storage and the associated application data may have already been backed up and saved at the network storage or may be sent to the network storage during offloading of the application. Further, in some examples, saved application state information may also be saved at the network storage. In other examples of offloading the application, rather than uninstalling the application from the electronic device, the application file (e.g., an APK file) may be removed from the electronic device and saved to the network storage without uninstalling the application or application data. Further, if an OBB file or other asset file is associated with the particular application, this application file may also be saved to the network storage and deleted from the electronic device. Further, in some examples, the application data generated by execution of the application and the saved application state information may remain on the electronic device, while one or more application files (e.g., an APK file and an OBB file in the case of an ANDROID® OS) may be offloaded from the electronic device to the network storage without uninstalling the application from the electronic device.

At 912, the electronic device may send a request to the computing device associated with the network storage for an application file of the application to be onloaded. In some cases, the associated application data and saved state information may have been retained on the electronic device, and the application file may have been uninstalled or otherwise offloaded without uninstalling. In other cases, the application file may have been uninstalled or otherwise offloaded without uninstalling the application, and the application data and/or saved state information may have also been offloaded to the network storage.

At 914, the electronic device may receive, from the computing device, the application file, and in some cases, the saved application state information and/or application data previously saved to the network storage.

At 916, the electronic device may execute the application on the electronic device using, at least in part, the saved application state information and the application data. For example, the application state information may include at least one of: a value for a variable used by the application on the electronic device; a value saved for an application setting set on the electronic device; a graphic user interface configuration saved on the electronic device; or a value for a user input received on the electronic device.

FIG. 10 is a flow diagram illustrating an example process 1000 for application management according to some implementations. In some examples, the process may be executed by the service computing device 136 or by another suitable computing device.

At 1002, the computing device may receive an application file from an electronic device. For example, the electronic device may send an offloaded application file to the computing device for storage at the network storage. As one example, the application may be uninstalled or otherwise offloaded from the electronic device and the installable application file and application data may be received by the computing device at the network storage. Further, in some examples, saved application state information may also be received from the electronic device. In some examples, rather than uninstalling the application from the electronic device, the application file (e.g., an APK file) may be removed from the electronic device and received by the computing device at the network storage without uninstalling the application or application data. Further, if an OBB file or other asset application files are associated with the particular application, these may also be received by the computing device at the network storage and deleted from the electronic device.

At 1004, the computing device may compare an identifier associated with the application file with a list of application files to be executed on an emulator that emulates execution on the electronic device. For example, the computing device may determine that the received application file is for a type of application that receives or generates notifications or other application information as a background process when installed on the electronic device. In some examples, the list may identify particular applications or application developers, while in other examples, the list may merely identify application types. The emulator may be a software device emulator that executes on the computing device and emulates the function and operation of the electronic device on the computing device.

At 1006, in response to determining a match between the identifier and the list, the computing device may execute the application file using the emulator. For example, the computing device may install the application file on the emulator. Further, the computing device may restore the application file to its state on the electronic device using the application data and/or saved application state information received from the electronic device. Accordingly, the application may execute on the emulator in a manner similar to its execution on the electronic device.

At 1008, the computing device may receive application information from the application executing on the emulator. For example, the computing device may receive notifications, messages, or other application information received by or generated by the application executing on the emulator. As one example, the application may communicate with a website on a remote computing device, and may receive an application notification or other application information from the remote computing device.

At 1010, the computing device may send the application information to the electronic device. For example, the computing device may send the application notification received by or generated by the application executing on the emulator to the electronic device so that the electronic device can present the notification on a display of the electronic device. For example, the notification may be presented in a notification UI on the electronic device as if the application were executing on the electronic device, rather than on the computing device at the network storage.

At 1012, the computing device may receive, from the electronic device, a request for the application file. In some examples, the electronic device may initiate onloading of the application in response to receiving the application information from the application executing on the emulator. In other examples, the electronic device may onload the application in response to user selection of an application representation of the application presented in the notifications UI on the electronic device.

At 1014, the computing device may send the application file to the electronic device. For example, the computing device may cease execution of the application file by the emulator, uninstall the application from the emulator, and send the application file to the electronic device. Further, in some examples, the emulator may save an application state of the application on the emulator, and the computing device may send the saved application state and saved application data to the electronic device.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 11:
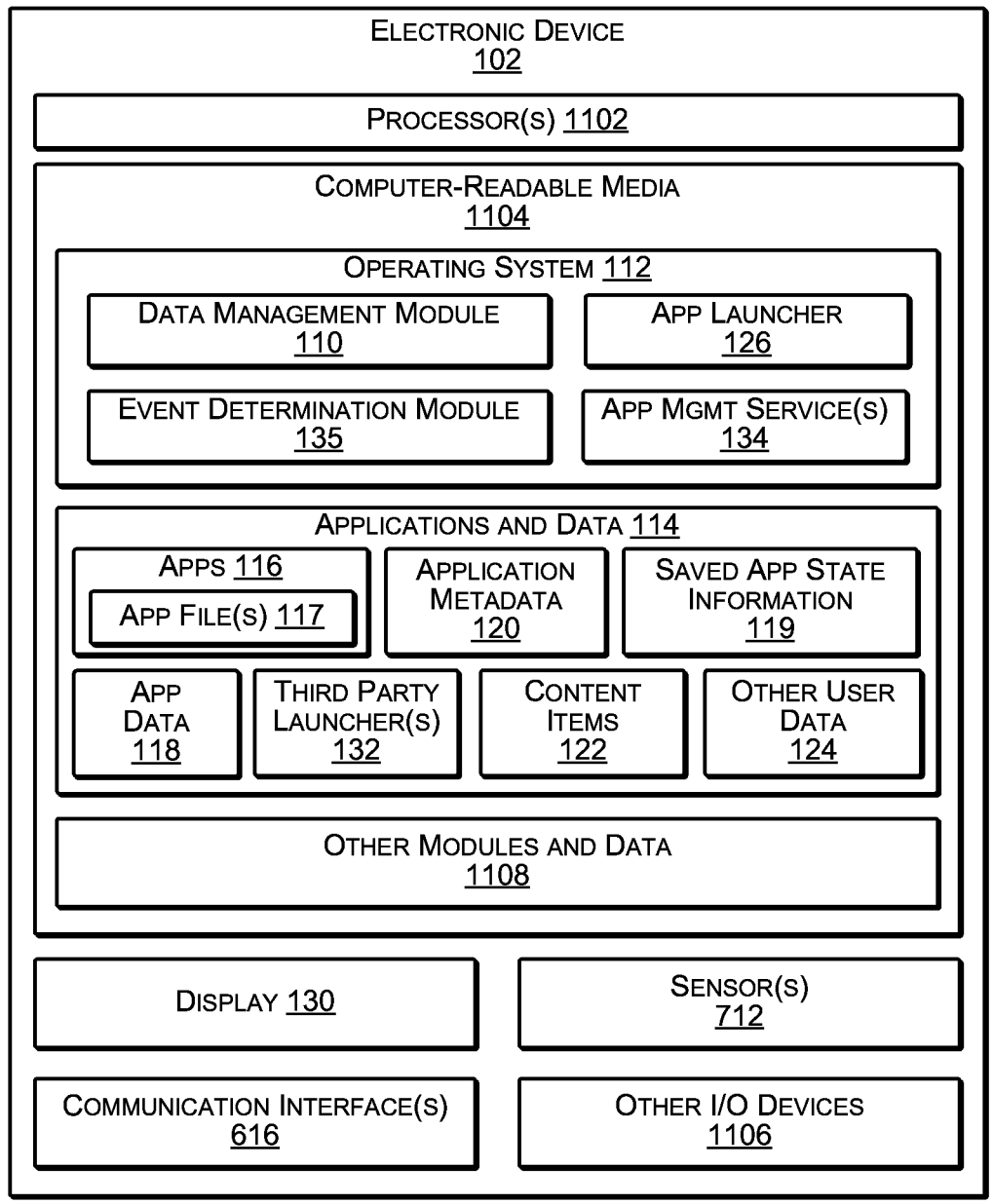
FIG. 11 illustrates select components of an example electronic device according to some implementations.

FIG. 11 illustrates select example components of the electronic device 102 that may implement the functionality described above according to some examples. The electronic device 102 may be any of a number of different types of computing devices, as enumerated above. In the example of FIG. 11, the electronic device 102 includes a plurality of components, such as at least one processor 1102, one or more computer-readable media 1104, the one or more communication interfaces 616, and one or more input/output (I/O) devices 1106. Each processor 1102 may itself comprise one or more processors or processing cores. For example, the processor 1102 can be implemented as one or more microprocessors, microcomputers, microcontrollers, digital signal processors, central processing units, state machines, logic circuitries, and/or any devices that manipulate signals based on operational instructions. In some cases, the processor 1102 may be one or more hardware processors and/or logic circuits of any suitable type specifically programmed or configured to execute the algorithms and processes described herein. The processor 1102 can be configured to fetch and execute computer-readable processor-executable instructions stored in the computer-readable media 1104.

Depending on the configuration of the electronic device 102, the computer-readable media 1104 may be an example of tangible non-transitory computer storage media and may include volatile and nonvolatile memory and/or removable and non-removable media implemented in any type of technology for storage of information such as computer-readable instructions, data structures, program modules, or other data. The computer-readable media 1104 may include, but is not limited to, RAM, ROM, EEPROM, flash memory, solid-state storage, magnetic disk storage, optical storage, and/or other computer-readable media technology. Further, in some cases, the electronic device 102 may access external storage, such as RAID storage systems, storage arrays, network attached storage, storage area networks, cloud storage, or any other medium that can be used to store information and that can be accessed by the processor 1102 directly or through another computing device or network. Accordingly, the computer-readable media 1104 may be computer storage media able to store instructions, modules, or components that may be executed by the processor 1102. Further, when mentioned, non-transitory computer-readable media exclude media such as energy, carrier signals, electromagnetic waves, and signals per se.

The computer-readable media 1104 may be used to store and maintain any number of functional components that are executable by the processor 1102. In some implementations, these functional components comprise instructions or programs that are executable by the processor 1102 and that, when executed, implement operational logic for performing the actions attributed above to the electronic device 102. Functional components of the electronic device 102 stored in the computer-readable media 1104 may include the data management module 110, the application launcher 126, the application management service 134, the event determination module 135, as well as the applications 116, comprising application files 117, and the third party launcher(s) 132, if any. Additional functional components may include the operating system 112 for controlling and managing various functions of the electronic device 102 and for enabling basic user interactions with the electronic device 102. In some examples, the data management module 110 and/or the application launcher 126 may be one or more modules of the operating system 112, while in other examples, some or all of these modules may be separate from the operating system 112.

The computer-readable media 1104 may store the application data 118, saved application state information 119, application metadata 120, content items 122, and other user data 124. In addition, depending on the type of the electronic device 102, the computer-readable media 1104 may also store other functional components and data, such as other modules and data 1108, which may include applications, programs, drivers, etc., and other data used or generated by the functional components. Further, the electronic device 102 may include many other logical, programmatic and physical components, of which those described are merely examples that are related to the discussion herein.

The communication interface(s) 616 may include one or more interfaces and hardware components for enabling communication with various other devices, such as over the network(s) 106 or directly. For example, communication interface(s) 616 may enable communication through one or more of the Internet, cable networks, cellular networks, wireless networks (e.g., Wi-Fi) and wired networks, as well as close-range communications such as BLUETOOTH®, and the like, as additionally enumerated elsewhere herein.

FIG. 11 further illustrates that the electronic device 102 may include the display 130. Depending on the type of computing device used as the electronic device 102, the display 130 may employ any suitable display technology able to present digital content thereon. In some examples, the display 130 may have a touch sensor (not shown) associated with the display 130 to provide a touchscreen display configured to receive touch inputs for enabling interaction with a UI presented on the display 130. Accordingly, implementations herein are not limited to any particular display technology. Alternatively, in some examples, the electronic device 102 may not include a display.

The electronic device 102 may further include sensors 712, such as a GPS device, an accelerometer, gyroscope, compass, proximity sensor, and the like. The electronic device 102 may further include one or more other I/O devices 1106. The I/O devices 1106 may include speakers, a microphone, a camera, and various user controls (e.g., buttons, a joystick, a keyboard, a keypad, etc.), a haptic output device, and so forth. Additionally, the electronic device 102 may include various other components that are not shown, examples of which may include removable storage, a power source, such as a battery and power control unit, and so forth.

Figure 12:
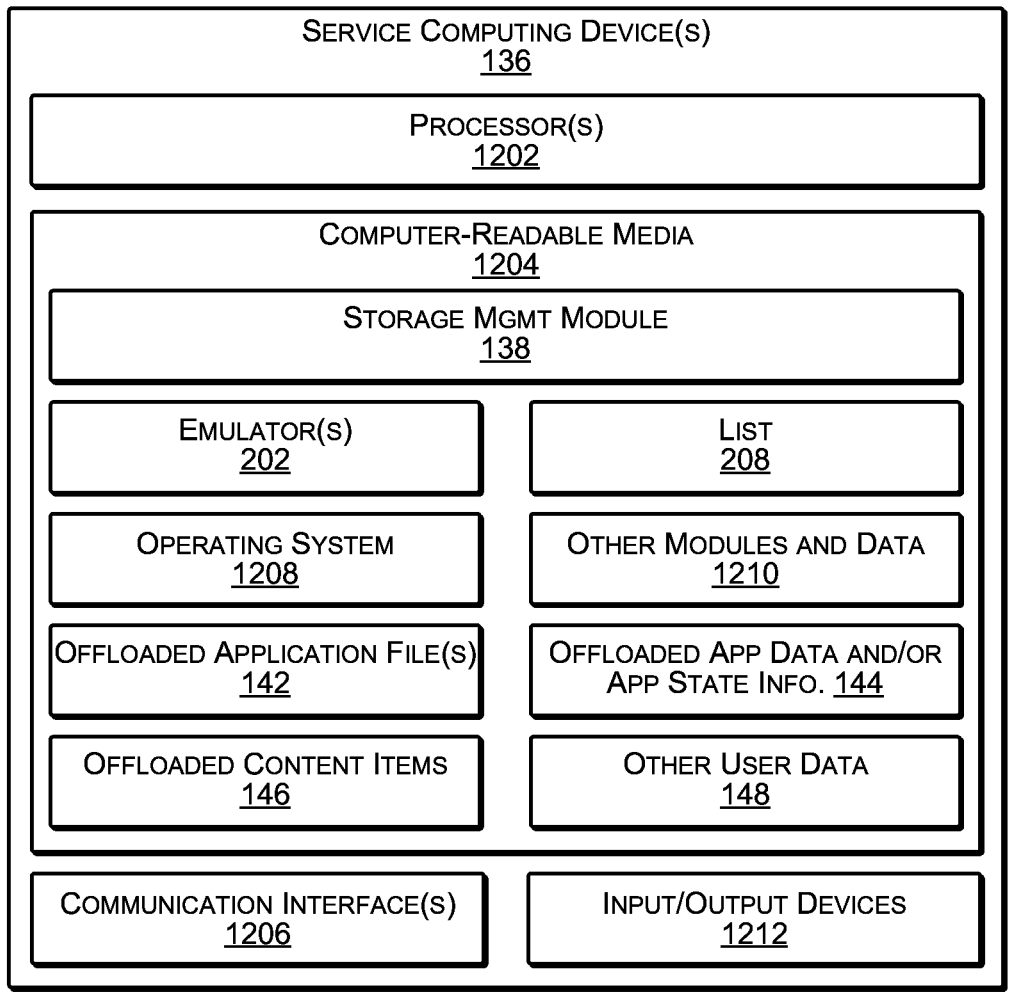
FIG. 12 illustrates select components of one or more example service computing devices according to some implementations.

FIG. 12 illustrates select components of the one or more service computing device(s) 136 that may be used to implement some functionality of the application management service described herein. In some examples, the service computing device 136 may be operated by a service provider that provides the network storage service, and may include one or more servers or other types of computing devices that may be embodied in any number of ways. For instance, in the case of a server, the modules, other functional components, and data storage (e.g., storage devices 140) may be implemented on a single server, a cluster of servers, a server farm or data center, a cloud-hosted computing service, a cloud-hosted storage service, and so forth, although other computer architectures may additionally or alternatively be used.

Further, while the figures illustrate the components and data of the service computing device 136 as being present in a single location, these components and data may alternatively be distributed across different computing devices and different locations in any manner. Consequently, the functions may be implemented by one or more service computing devices, with the various functionality described above distributed in various ways across the different computing devices. Multiple service computing devices 136 may be located together or separately, and organized, for example, as virtual servers, server banks, and/or server farms. The described functionality may be provided by the servers of a single entity or enterprise, or may be provided by the servers and/or services of multiple different buyers or enterprises.

In the illustrated example, each service computing device 136 may include, or may have associated therewith, one or more processors 1202, one or more computer-readable media 1204, and one or more communication interfaces 1206. Each processor 1202 may be a single processing unit or a number of processing units, and may include single or multiple computing units or multiple processing cores. The processor(s) 1202 can be implemented as one or more microprocessors, microcomputers, microcontrollers, digital signal processors, central processing units, state machines, logic circuitries, and/or any devices that manipulate signals based on operational instructions. For instance, the processor(s) 1202 may be one or more hardware processors and/or logic circuits of any suitable type specifically programmed or configured to execute the algorithms and processes described herein. The processor(s) 1202 can be configured to fetch and execute computer-readable instructions stored in the computer-readable media 1204, which can program the processor(s) 1202 to perform the functions described herein.

The computer-readable media 1204 may include the storage devices 140 discussed above with respect to FIG. 1 (not shown in FIG. 12). In some cases, the storage devices 140 may be at the same location as the service computing device(s) 136, while in other examples, the storage devices 140 may be remote from the service computing device(s) 136. The computer-readable media 1204 may further include volatile and nonvolatile memory and/or removable and non-removable media implemented in any type of technology for storage of information, such as computer-readable instructions, data structures, program modules, or other data. Such computer-readable media 1204 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device 136, the computer-readable media 1204 may be a type of computer-readable storage media and/or may be a tangible non-transitory media to the extent that when mentioned, non-transitory computer-readable media exclude media such as energy, carrier signals, electromagnetic waves, and signals per se.

The computer-readable media 1204 may be used to store any number of functional components that are executable by the processors 1202. In many implementations, these functional components comprise instructions or programs that are executable by the processors 1202 and that, when executed, specifically configure the one or more processors 1202 to perform the actions attributed above to the service computing device 136. Functional components stored in the computer-readable media 1204 may include the storage management module 138 and the emulator(s) 202. Additional functional components stored in the computer-readable media 1204 may include an operating system 1208 for controlling and managing various functions of the service computing device 136.

In addition, the computer-readable media 1204 may store data used for performing the functions and services described herein. Thus, the computer-readable media 1204 may store the list 208 of applications to run on the emulator 202, the offloaded application files 142, the offloaded application data and/or saved application state information 144, the offloaded content items 146, and the other user data 148. The service computing device 136 may also include or maintain other functional components and data, such as other modules and data 1210, which may include programs, drivers, etc., and the data used or generated by the functional components. Further, the service computing device 136 may include many other logical, programmatic, and physical components, of which those described above are merely examples that are related to the discussion herein.

The communication interface(s) 1206 may include one or more interfaces and hardware components for enabling communication with various other devices, such as over the network(s) 106. For example, communication interface(s) 1206 may enable communication through one or more of the Internet, cable networks, cellular networks, wireless networks (e.g., Wi-Fi) and wired networks, as well as short-range communications such as BLUETOOTH®, and the like, as additionally enumerated elsewhere herein.

The service computing device 136 may further be equipped with various input/output (I/O) devices 1212. Such I/O devices 1212 may include a display, various user interface controls (e.g., buttons, joystick, keyboard, mouse, touch screen, etc.), audio speakers, connection ports and so forth.

Various instructions, methods, and techniques described herein may be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. An electronic device comprising:
one or more processors; and
one or more computer-readable media storing instructions executable by the one or more processors, wherein the instructions program the one or more processors to:

save at least one of application state information or application data obtained, at least in part, from execution of an application on the electronic device;
offload the application from the electronic device;
send an application file associated with the application from the electronic device to a computing device over a network;
send a request to the computing device for the application file;
receive the application file from the computing device;
onload the application on the electronic device; and
configure the application for execution on the electronic device with at least one of the application state information or the application data,
wherein the instructions further program the one or more processors to onload the application by reinstalling the application onto the electronic device, wherein the reinstalling retains the at least one of the saved application state information or the saved application data saved on the electronic device.

2. The electronic device as recited in claim 1, wherein the instructions further program the one or more processors to send the request to the computing device for the application file in response to at least one of:
receipt of a user input that selects an application representation corresponding to the offloaded application;
a determination of an upcoming event that is likely to include use of the offloaded application;
a determination that a user usage pattern indicates that the offloaded application is likely to be used within a threshold time; or
receipt of an application notification from execution of the application file on an emulator.

3. The electronic device as recited in claim 1, wherein the instructions further program the one or more processors to offload the application from the electronic device by:
sending an application file corresponding to the application from the electronic device to the computing device; and
deleting the application file from the electronic device.

4. The electronic device as recited in claim 1, wherein the instructions further program the one or more processors to:
prior to saving the at least one of the application state information or the application data, install the application on the electronic device using a first application file installable on the electronic device;
offload the application by uninstalling the application from the electronic device to obtain a second application file installable on the electronic device, wherein the second application file omits at least one element included in the first application file, wherein the at least one element is useable with a type of device different from the electronic device; and
send the second application file as the application file sent to the computing device.

5. The electronic device as recited in claim 1, wherein the instructions further program the one or more processors to maintain metadata for the uninstalled application on the electronic device, the metadata including at least an application representation icon corresponding to the application and an identifier of the application.

6. The electronic device as recited in claim 1, wherein the instructions further program the one or more processors to select the application for offloading to the computing device based at least in part on at least one of:
an amount of time since the application was last accessed on the electronic device;
a frequency with which the application was accessed over a period of time;
an amount of storage space consumed by the application; or
an amount of available storage space remaining on the electronic device.

7. A method comprising:
presenting an application launcher user interface (UI) on a display associated with an electronic device, the application launcher UI including a first application representation corresponding to an application offloaded from the electronic device, and a second application representation corresponding to an other application onloaded to the electronic device;
receiving, by one or more processors of the electronic device, inputs from at least one of: a calendar, a sensor on the electronic device, a user input, or information about prior user activities;
determining an upcoming event based at least in part on the plurality of inputs;
determining an offloaded application to onload onto the electronic device for the event;
sending a request to a computing device for an application file of the application to onload onto the electronic device;
receiving the application file from the computing device; and
configuring the application for execution on the electronic device with saved application state information saved prior to offloading of the application.

8. The method as recited in claim 7, further comprising offloading another application from the electronic device by at least one of uninstalling the other application or deleting an application file corresponding to the other application, and sending the application file corresponding to the other application to the computing device.

9. The method as recited in claim 8, further comprising offloading the other application from the electronic device based at least in part on at least one of:
an amount of time since the other application was last accessed on the electronic device;
a frequency with which the other application was accessed over a period of time;
an amount of storage space consumed by the other application file; or
an amount of available storage space remaining on the electronic device.

10. The method as recited in claim 7, further comprising, prior to executing the application, reinstalling the application on the electronic device.

11. The method as recited in claim 7, further comprising receiving, from the computing device, at least one of:
the saved application state information; or
application data saved prior to offloading of the application.

12. The method as recited in claim 7, wherein the saved application state information includes at least one of:
a value for a variable used by the application on the electronic device;
a value saved for an application setting set on the electronic device;
a graphic user interface configuration saved on the electronic device; or
a value for a user input received on the electronic device.

13. A computing device comprising:
one or more processors; and
one or more computer-readable media storing instructions executable by the one or more processors, wherein the instructions program the one or more processors to:
receive an application file from an electronic device;
execute an application corresponding to the application file using an emulator, wherein the emulator emulates, at least in part, execution of the application on the electronic device;
receive application information from the application executing on the emulator; and
send the application information to the electronic device, wherein the instructions further program the one or more processors to:
receive a request from the electronic device for the application file;
cease execution of the application file by the emulator; and
send, to the electronic device, the application file.

14. The computing device as recited in claim 13, wherein the instructions further program the one or more processors to:
receive, from the electronic device, at least one of:
application data saved from execution of the application on the electronic device; or
application state information, the application state information indicating a state of the application executed on the electronic device; and
configure the application on the emulator based on at least one of the application data or the application state information.

15. The computing device as recited in claim 13, wherein the instructions further program the one or more processors to:
compare an identifier associated with the application file with a list of application files to be executed on the emulator; and
execute the application file using emulator based at least in part on determining a match between the list and the identifier.

16. The computing device as recited in claim 13, wherein the application information is an application notification and the instructions further program the one or more processors to:
receive, as a result of execution of the application file on the emulator, a communication corresponding to the application notification from a remote computing device; and
send the application notification to the electronic device for presentation on the electronic device.

17. The computing device as recited in claim 13, wherein the instructions further program the one or more processors to send to the electronic device at least one of:
application data generated at least in part by execution of the application file on the emulator; or
application state information saved from execution of the application file on the emulator.

* * * * *